United States Patent
Coman et al.

(10) Patent No.: US 12,223,423 B2
(45) Date of Patent: Feb. 11, 2025

(54) SYSTEMS AND METHODS FOR GENERATING AUTOMATED NATURAL LANGUAGE RESPONSES BASED ON IDENTIFIED GOALS AND SUB-GOALS FROM AN UTTERANCE

(71) Applicant: Capital One Services, LLC, McLean, VA (US)

(72) Inventors: Alexandra Coman, Tysons Corner, VA (US); Zachary Kulis, Arlington, VA (US); Rui Zhang, New York, NY (US); Liwei Dai, Oakton, VA (US); Erik T. Mueller, Chevy Chase, MD (US); Vinay Igure, Ashburn, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 1046 days.

(21) Appl. No.: 17/062,241

(22) Filed: Oct. 2, 2020

(65) Prior Publication Data
US 2022/0108164 A1 Apr. 7, 2022

(51) Int. Cl.
*G10L 15/22* (2006.01)
*G06F 40/56* (2020.01)
*G06N 3/08* (2023.01)

(52) U.S. Cl.
CPC .............. *G06N 3/08* (2013.01); *G06F 40/56* (2020.01); *G10L 15/22* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 8,027,945 B1* | 9/2011 | Elad | G06N 5/04 706/47 |
| 11,282,088 B1* | 3/2022 | Lancaster | G06Q 10/083 |
| 11,521,080 B2* | 12/2022 | Mueller | G06N 5/045 |
| 2001/0042010 A1* | 11/2001 | Hassell | G06Q 30/0269 705/14.69 |
| 2004/0093409 A1* | 5/2004 | Thompson | H04L 41/069 709/224 |
| 2012/0191629 A1 | 7/2012 | Shae et al. | |
| 2013/0179423 A1* | 7/2013 | Gur | G06F 16/9535 707/E17.108 |
| 2014/0337044 A1* | 11/2014 | Heinze | G16H 70/20 705/2 |
| 2015/0363774 A1* | 12/2015 | Priebatsch | G06Q 20/3223 705/76 |
| 2017/0196497 A1* | 7/2017 | Ray | G06N 7/01 |
| 2017/0249371 A1* | 8/2017 | Krupa | G06Q 10/10 |
| 2018/0067720 A1* | 3/2018 | Bekas | G06F 17/16 |
| 2019/0087756 A1* | 3/2019 | Hull | G06Q 10/06316 |

(Continued)

OTHER PUBLICATIONS

M. Nuruzzaman et al., "A Survey on Chatbot Implementation in Customer Service Industry through Deep Neural Networks," 2018 IEEE 15th International Conference on e-Business Engineering (ICEBE), Xi'an, 2018, pp. 54-61, doi: 10.1109/ICEBE.2018.00019.

*Primary Examiner* — Ryan Barrett
(74) *Attorney, Agent, or Firm* — TROUTMAN PEPPER LOCKE LLP; Christopher J. Forstner; John A. Morrissett

(57) ABSTRACT

The disclosed technology involves autonomously identifying goals and sub-goals from a user utterance and generating responses to the user based on the goals and sub-goals.

20 Claims, 10 Drawing Sheets

(56) References Cited

U.S. PATENT DOCUMENTS

| | | | |
|---|---|---|---|
| 2020/0356871 A1* | 11/2020 | Mueller | G06Q 10/04 |
| 2021/0027103 A1* | 1/2021 | Brower | G06N 3/08 |
| 2022/0036177 A1* | 2/2022 | Sriharsha | G06N 3/10 |
| 2022/0067540 A1* | 3/2022 | Ferrucci | G06N 5/04 |
| 2022/0101833 A1* | 3/2022 | Ross | G10L 15/1822 |

* cited by examiner

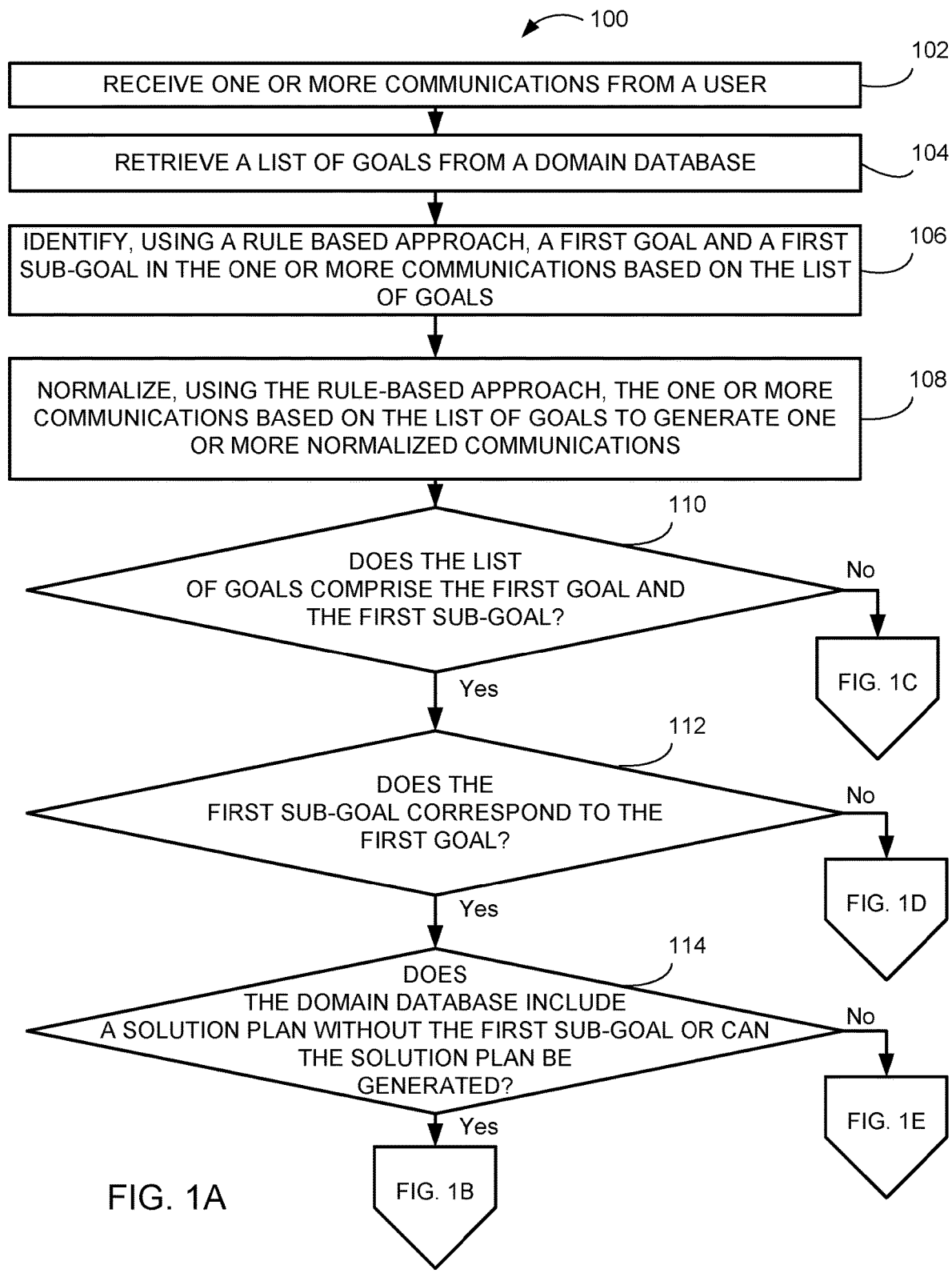

SYSTEMS AND METHODS FOR GENERATING AUTOMATED NATURAL LANGUAGE RESPONSES BASED ON IDENTIFIED GOALS AND SUB-GOALS FROM AN UTTERANCE

FIELD

The disclosed technology relates to autonomously identifying goals and sub-goals from a user utterance and generating responses to the user based on the goals and sub-goals.

BACKGROUND

Artificial intelligence (AI) chat agents are becoming more prevalent and often receive requests from users to perform certain actions. Existing AI agents may take the user's request at face value and provide a response to it. For example, a user may request the following: "I've switched to the paperless option and I can't access my documents online! Please switch me back to paper documents!" In response to the example request, existing AI agents may simply provide the user with instructions on how to switch to paper document options when the user really just needed instructions on how to access their documents online. Thus, there may be a disconnect between the determined intent of the user utterance and an implied goal or sub-goal of the user that results in a proposed solution that does not meet the implied user need and results in a less desirable interaction with the AI system.

Accordingly, there is a need for improved, automated chat systems that can autonomously identify, process, and respond to a user goal (i.e., a user's needs) and a sub-goal (i.e., a user's suggested solution or suggested way to achieve the goals). Embodiments of the present disclosure are directed to this and other considerations.

SUMMARY

Disclosed herein are systems and methods for identifying user goals and sub-goals and generating responses to users based on the goals and sub-goals.

Consistent with the disclosed embodiments, a computer-implemented method is provided for autonomously identifying user goals and sub-goals and generating responses to users based on the goals and sub-goals. The method may include receiving one or more communications from a user. The method may also include retrieving a list of goals from a domain database. The method may include identifying, using a rule-based approach, a first goal and a first sub-goal in the one or more communications based on the list of goals. The method may also include normalizing, using a rule-based approach, the one or more communications based on the list of goals and the list of sub-goals to generate one or more normalized communications. The method may also include determining whether the list of goals includes the first goal and the first sub-goal. When the list of goals includes the first goal and the first sub-goal, the method may include determining whether the first sub-goal corresponds to the first goal based on the list of goals. When the list of goals includes the first goal and the first sub-goal and the first sub-goal corresponds to the first goal, the method may include determining whether the domain database includes at least one solution plan for the first goal that does not involve the first sub-goal or whether the at least one solution plan can be generated. When the domain database includes the at least one solution plan for the first goal that does not involve the first sub-goal or the at least one solution plan can be generated, the method may include determining, using the machine learning model, whether the one or more normalized communications include an expression of preference for the first sub-goal. When the one or more normalized communications include the expression of preference for the first sub-goal, the method may include generating a first recommended solution by selecting a solution plan from the at least one solution plan.

The method may include determining whether the first recommended solution involves the first sub-goal. When the first recommended solution does not involve the first sub-goal, the method may include providing the first recommended solution to the user with a first explanation explaining why the first sub-goal was excluded. When the first recommended solution involves the first sub-goal, the method may include providing the first recommended solution to the user.

Consistent with the disclosed embodiments, a computer-implemented method is provided for autonomously identifying user goals and sub-goals and generating responses to users based on the goals and sub-goals. The method may include receiving one or more first communications from a user. The method may also include retrieving a list of goals from a domain database. The method may include identifying, using a rule-based approach, a first goal and a first sub-goal in the one or more communications based on the list of goals. The method may also include normalizing, using the rule-based approach, the one or more first communications based on the list of goals to generate one or more first normalized communications. The method may also include determining whether the list of goals includes the first goal and the first sub-goal. When the list of goals includes the first goal and the first sub-goal, the method may include determining whether the first sub-goal corresponds to the first goal based on the list of goals. When the first goal is in the list of goals, the first sub-goal is in the list of goals, and the first sub-goal corresponds to the first goal, the method may include determining whether the domain database includes at least one possible solution for the first goal that does not include the first sub-goal or whether the at least one possible solution can be generated. When the domain database does not include at least one possible solution for the first goal that does not include the first sub-goal, the method may include determining whether the at least one possible solution is admissible. An admissible solution: (1) is feasible given the current circumstances of the customer and the system and (2) meets any domain-specific admissibility criteria such as safety and ethical acceptability. When the at least one possible solution is admissible, the method may include generating a first recommended solution based on the at least one possible solution and provide the first recommended solution to the user.

Consistent with the disclosed embodiments, a computer-implemented method is provided for autonomously identifying user goals and sub-goals and generating responses to users based on the goals and sub-goals. The method may include receiving one or more communications from a user. The method may also include retrieving a list of goals from a domain database. The method may also include identifying, using a rule-based approach, a first goal and a first sub-goal in the one or more communications based on the list of goals. The method may also include normalizing, using the rule-based approach, the one or more communications based on the list of goals to generate one or more normalized communications.

The method may also include determining whether the list of goals includes the first goal and the first sub-goal. When list of goals includes the first goal and the first sub-goal, the method includes determining whether the first sub-goal corresponds to the first goal based on the list of goals. When the list of goals includes the first goal and the first sub-goal, and the first sub-goal corresponds to the first goal, the method may also include determining whether the domain database includes at least one solution plan for the first goal that does not include the first sub-goal or whether the at least one solution plan can be generated. When the domain database includes the at least one solution plan for the first goal that does not include the first sub-goal or the at least one solution plan can be generated, the method may include determining whether the one or more normalized communications includes an expression of preference for the first sub-goal. When the one or more normalized communications do not include the expression of preference for the first sub-goal, the method may include generating a recommended solution by selecting a solution plan from the at least one solution plans of generating a solution plan using an approach such as first-principles planning. The method may also include providing the recommended solution to the user with an explanation of the recommended solution.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIG. 1A, FIG. 1B, FIG. 1C, FIG. 1D, FIG. 1E, and FIG. 1F are flow charts of a method 100 for autonomously identifying user goals and sub-goals and generating responses to users based on the goals and sub-goals, in accordance with an example implementation of the disclosed technology.

DETAILED DESCRIPTION

Figure 1B:
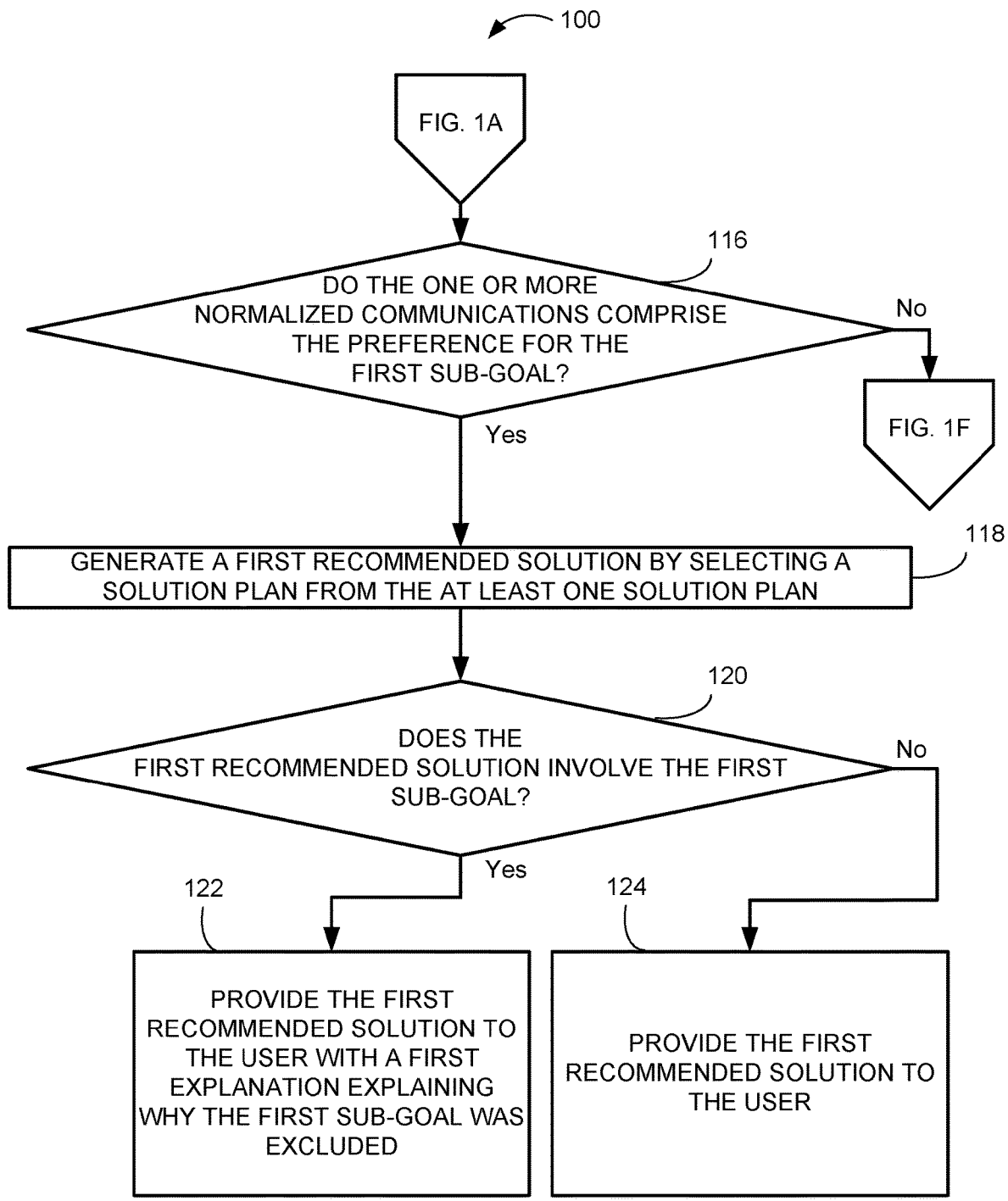

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

According to certain example implementations of the disclosed technology, systems and methods are disclosed herein for autonomously identifying user goals and sub-goals and generating responses to users based on the goals and sub-goals based on an utterance received from the user and/or a machine-based dialogue (e.g., electronic text communication) with the user. For example, in one aspect, a system is provided for autonomously receiving and interpreting a user's utterance or electronic text communication to determine, using a user solution system, whether such communication from the user includes a goal, sub-goal, and/or a preference. The user solution system may identify a goal, sub-goal, and/or a preference from the communication.

The user solution system may access one or more databases to retrieve details related to the user including, but not limited to, order history, shipment tracking, proof of delivery, billing information, etc. In certain implementations, the user solution system may further retrieve rules from a rule-based platform that may be utilized to verify, confirm, and/or dispute a perceived discrepancy and/or one or more assertions. For example, the rule-based platform may include pertinent information related to normal and/or special procedures for shipping pricing, date ranges for special offers, prerequisites for special pricing, etc. that may be compared with the user's assertions for generating an appropriate response and/or for modifying a stock response.

In certain implementations, the user solution system may prepare dialog modifying commands based on the identified goal, sub-goal, and preference, other assertions, user and/or order history data available to the system, and/or associated rules from the rule-based platform. The user solution system may use such dialog modifying commands to program a natural language processing (NLP) device to, for example, modify a response with details related to the user's communication. The dialog modifying commands, for example, may be utilized by the NLP device to generate/revise a natural language response that can include: a request for verification of certain details related to the user's communication, a confirmation of a detected assertion, a response disputing one or more detected assertions, a request for additional information from the user regarding the identified goal, sub-goal, or preference, etc. Such interactions may be carried out by the systems and methods disclosed herein without involving a human user service agent. Accordingly, the user response system may program the NLP device and may use feedback received from the user to further revise or update the dialog modifying commands in an iterative manner.

In addition to questions received from the user, certain assertions can also function as requests for explanation from the user and may include expressions of perceived discrepancies. "I was charged for shipping!", for example, can reasonably be understood to imply that the user expected not to be charged for shipping and would like an explanation and/or resolution of that occurrence.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1A, FIG. 1B, FIG. 1C, FIG. 1D, FIG. 1E, and FIG. 1F are flow charts of a method 100 for autonomously identifying user goals and sub-goals and generating responses to users based on the goals and sub-goals, in accordance with an example implementation of the disclosed technology. Method 100 may be performed by a system (e.g., a user response system 201 and/or some or all of the devices and systems within a system 200 (e.g., user solution system 220) described in more detail with respect to FIGS. 2 and 3 below).

In block 102, the user response system 201 (e.g., web server 210 or call center server 212) may receive one or more communications from a user via user device 202. These communications or dialogue may be in the form of a text message, chat message via an online or in application chat session, email, or voice call. For example, the user response system 201 may receive via text, email, chat message, or via a phone call or other audio means, the following statements: "I want to create a new account, so I need to get a new PIN number. I really want a new PIN number, not some other option."

In block 104, the user response system 201 may retrieve a list of goals from a domain database (e.g., database 218 or database 380). In addition to the list of goals the domain database may include a representation, such as a graph-based representation, of the relationship between goals and sub-goals of the list of goals, specifying, for example, that a given sub-goal A' in the list of goals is associated to a goal A in the list of goals. In the graph-based representation, some nodes may have associated solution plans, so that, by executing the actions in the solution plan, one may expect to achieve the goal/sub-goal.

In block 106, the user response system 201 may identify, using a rule based approach, a first goal and a first sub-goal in the one or more communications based on the list of goals.

In block 108, the user response system 201 may normalize, using the rule-based approach, the one or more communications based on the list of goals and sub-goals to generate one or more normalized communications. For example, the user response system 106 may identify text or audio that is converted to text associated with a goal or a sub-goal and replace that identified text with placeholder text. For example, the utterance "I'm trying to get a new PIN in order to create a new account." may become "I'm trying to [A] in order to [B].", and the utterance "I want to create a new account, so I need to get a new PIN number." may become "I want to [A], so I need to [B]." A rule-based approach may be used to identify goals from the domain knowledge in the utterances, and replace them with placeholder text. The list of goals may be available as part of the domain knowledge (the domain knowledge may consist of a collection of graph representations of goal/sub-goal relationships). Regular expressions may be used to identify known goals in the utterances: wording that perfectly matches the goal name from the domain knowledge as well as known synonyms, order variations, common misspellings/typos and/or other variations (e.g., "create a new account", "make a new account", "make account", etc.)

In block 110, the user response system 201 may determine whether the list of goals includes the first goal and the first sub-goal. For example, if the user stated in the incoming communication "I want to create a new account, so I need to get a new PIN number. I really want a new PIN number, not some other option," the user response system would compare the goal of creating a new account to the goals in the list of goals to see if there is a match or an approximate match (e.g., a fuzzy match using for example Levenshtein Distance may be used to calculate the difference between two text strings). Similarly, if the user response system 201 would compare the sub-goal of creating a new PIN number to the sub-goals in the list of goals to see if there is a match or an approximate match (e.g., a fuzzy match). When the user response system 201 determines that the list of goals does not include the first goal or the first sub-goal, proceed to block 126 in FIG. 1C. For example, when the user response system 201 determines that the first does not match or fuzzy match any of the goals or sub-goals in the list of goals. When the user response system 201 determines that the list of goals includes the first goal and the first sub-goal, proceed to block 112.

In block 112, the user response system 201 may, using a machine learning model 395, determine whether the first sub-goal corresponds to the first goal based on the list of goals. This may be achieved by checking whether the goal node is a parent or ancestor of the sub-goal node in the graph-based representation of goal/sub-goal relationships, assuming the graph is a tree or a similar hierarchical structure. When the user response system 201 determines that the first sub-goal does not correspond to the first goal, proceed to block 132 in FIG. 1D. When the user response system 201 determines that the first sub-goal corresponds to the first goal, proceed to block 114. The machine learning model 395, which has been trained to recognize language referring to goal/sub-goal relationships and preference expressions. The machine learning model 395 is trained to recognize language referring to goals, sub-goal, and preferences (discussed below) based on training data where the machine learning model 395 is fed normalized text statements with matching goals, sub-goals, and preference expressions.

In block 114, the user response system 201 may determine whether the domain database (e.g., database 380 or database 218) comprises at least one solution plan for the first goal that does not involve the first sub-goal. For example, the user response system 201 may retrieve or search the domain database for at least one solution plan for creating a new account that does not involve creating a new PIN. When the user response system 201 determines that the domain database (e.g., database 380 or database 218) does not include at least one solution plan for the first goal (e.g., creating a new account) that does not involve the first sub-goal (e.g., creating a new PIN) and/or such a solution cannot be produced through generative techniques such as first-principles planning, proceed to block 148 in FIG. 1E. Put another way, this is a situation in which the user response system 201 determines that the domain database (e.g., database 380 or database 218) only includes one or more solution plans that involve the first sub-goal (e.g., creating a new PIN) and/or only such solutions can be developed through generative approaches. When the user response system 201 determines that the domain database (e.g., database 380 or database 218) includes at least one solution plan for the first goal (e.g., creating a new account) that does not involve the first sub-goal (e.g., creating a new PIN), proceed to block 116 in FIG. 1B.

In block 116 in FIG. 1B, the user response system 201 may determine, using the machine learning model 395, whether the one or more normalized communications include an expression of preference for the first sub-goal. When the user response system 201 determines that the one or more normalized communications do not include the expression of preference for the first sub-goal, proceed to block 156 in FIG. 1F. When the user response system 201 determines that the one or more normalized communications include the expression of preference for the first sub-goal, proceed to block 118. Here is an example of an expression of preference for a sub-goal B of a goal A: "I want to create a new account, so I need to get a new PIN number. I really want a new PIN number, not some other option!", which may be normalized as "I want to [A], so I need [B]. I really want [A], not some other option!"

In block 118, the user response system 201 may generate a first recommended solution by selecting a solution plan from the at least one solution plan, generating a solution plan using first-principles planning, and/or other AI and/or rule-based approaches or combinations of approaches. For example, the user response system 201 may select the solution plan that includes using the first-sub goal since the user indicated a preference for doing so. If there are multiple preexisting solution plans for achieving the goal through the sub-goal, the system may use various criteria, possibly domain-specific, for selecting one solution plan. For example, it may select the most frequently-used plan or a plan that has resulted in the greatest user satisfaction in the past.

In block 120, the user response system 201 may determine whether the first recommended solution involves/includes the first sub-goal. This can be achieved in a variety of ways, depending, among others, on the structure of the solution and the solution-generation/selection technique(s) that are being used. For example, a solution representation may specify the sub-goals. When the user response system 201 determines that the first recommended solution involves/includes the first sub-goal (e.g., the first recommended solution including opening a new account for the user and creating a new PIN), proceed to block 122. When the user response system 201 determines that the first recommended solution does not involve/include the first sub-goal (e.g., the first recommended solution creates a new account for the user but does not create a new PIN), proceed to block 124.

In block 122, the user response system 201 may provide the first recommended solution to the user with a first explanation explaining why the first sub-goal was excluded. For example, the user response system 201 may offer to open a new account for the user but state: "Obtaining a new PIN is not necessary to open a new account. However, if you would like to create a new PIN associated with the new account you can do so after the new account is created."

In block 124, the user response system 201 may provide the first recommended solution to the user and potentially offer to execute that solution, if applicable. For example, the user response system may offer to open a new account for the user. Some solutions may be executable only by the system, others may be executable only by the user, others may require the system and the user to act collaboratively (e.g., the system may send the user an email and the user may have to click on a link in the email to verify their email address).

Figure 1C:
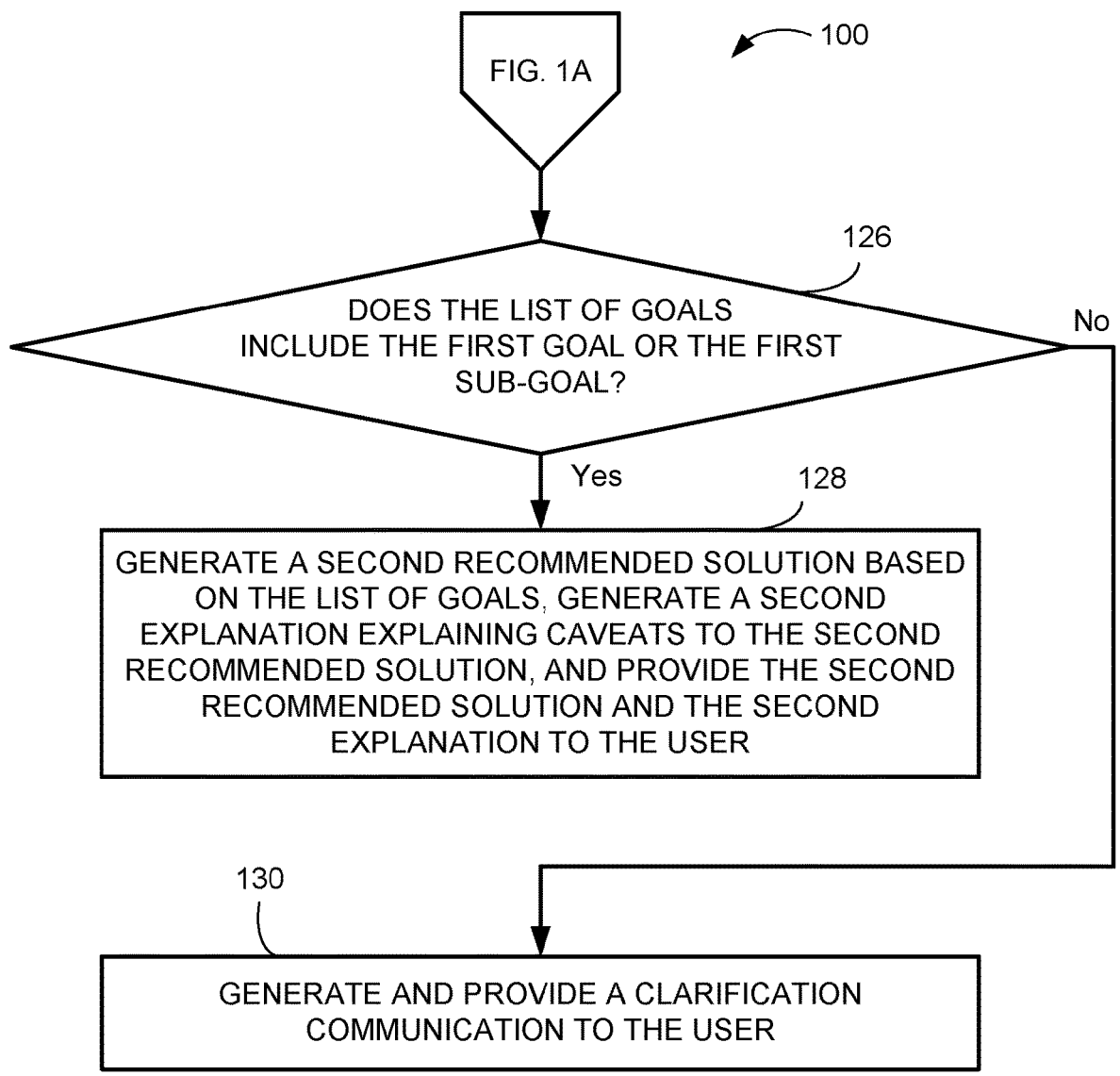

In block 126 in FIG. 1C, the user response system 201 may determine whether the list of goals includes the first goal or the first sub-goal. For example, if the user stated in the incoming communication "I want to create a new account, so I need to get a new PIN number. I really want a new PIN number, not some other option," the user response system may compare the goal of creating a new account, as expressed by the user, to the goals in the list of goals to see if there is a match or an approximate match (e.g., a fuzzy match using for example Levenshtein Distance may be used to calculate the difference between two text strings). Similarly, the user response system 201 may compare the sub-goal of creating a new PIN number to the sub-goals in the list of goals to see if there is a match or an approximate match (e.g., a fuzzy match). When the list of goals includes the first goal or the first sub-goal, proceed to block 128. When the list of goals does not include the first goal and does not include the first sub-goal, proceed to block 130.

In block 128, the user response system 201 may generate a second recommended solution based on the list of goals, generate a second explanation explaining caveats to the second recommended solution, and provide the second recommended solution and the second explanation to the user. For example, when the list of goals includes the first goal but does not include the first sub-goal, the user response system 201 may generate and provide the second recommended solution (e.g., creating a new account) that does not include the first sub-goal (e.g., creating a new PIN) along with the second explanation, which may explain to the user that a new PIN will not be created with creating/opening a new account.

In block 130, the user response system 201 may generate and provide a clarification communication to the user. For example, the user response 201 may generate a message that states "Unfortunately, I am unable to help you with your request as stated. Please try rephrasing the problem you would like help with."

Figure 1D:
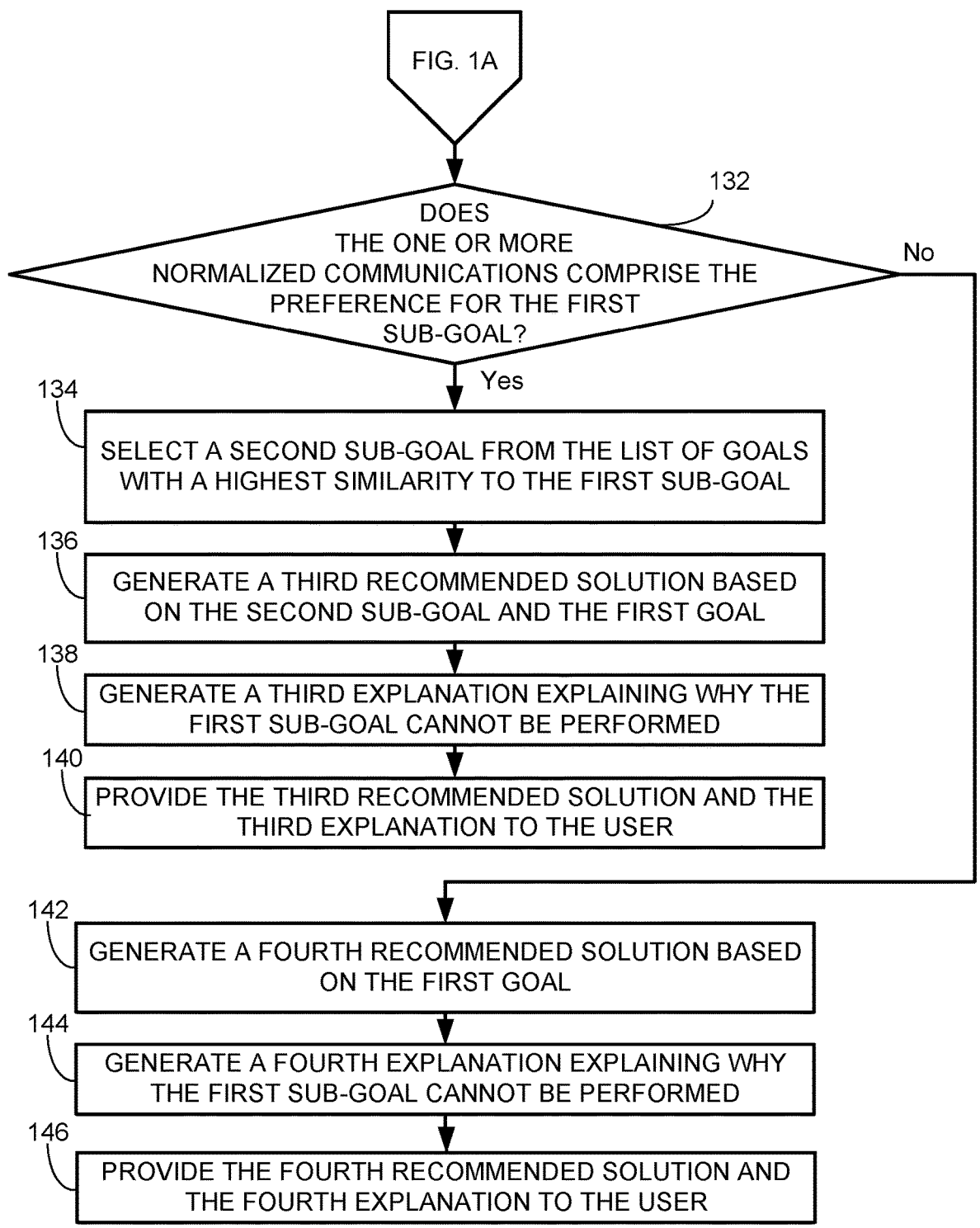

In block 132 of FIG. 1D, the user response system 201 may determine whether the one or more normalized communications include the preference for the first sub-goal. For example, the user response system 201 may use the trained machine learning model 395 to identify language expressing a preference and map its relationship to the first sub-goal. An expression of a preference may also be identified through rule-based approaches, e.g., via regular expressions. When the user response system 201 determines that the one or more normalized communications include the preference for the first sub-goal, proceed to block 134. When the user response system 201 determines that the one or more normalized communications do not include the preference for the first sub-goal, proceed to block 142.

In block 134, the user response system 201 may select a second sub-goal from the list of goals with a highest similarity to the first sub-goal. A wide variety of similarity metrics from fields such as case-based reasoning could be used for this purpose. For example, the user response system 201 may fuzzy match the first sub-goal with each sub-goal in the list of goals using Levenshtein Distance and the sub-goal with the closet match to the first sub-goal would be selected.

In block 136, the user response system 201 may generate a third recommended solution based on the second sub-goal and the first goal. For example, the user response system 201 may offer to open a new account with a default PIN (second sub-goal) that can be customized at a later date.

In block 138, the user response system 201 may generate a third explanation explaining why the first sub-goal cannot be performed. For example, the user response system 201 may generate a response that states, "Customized PINs must be created after a new account is created."

In block 140, the user response system 201 may provide the third recommended solution and the third explanation to the user. For example, the user response system 201 may transmit the third recommended solution and the third explanation to the user device 202 via the network 206.

In block 142, the user response system 201 may generate a fourth recommended solution based on the first goal. For example, the user response system 201 may offer to open a new account without a PIN.

In block 144, the user response system 201 may generate a fourth explanation explaining why the first sub-goal cannot be performed. For example, the user response system 201 may generate an explanation that states: "A PIN cannot be created until after a new account is created."

In block 146, the user response system 201 may provide the fourth recommended solution and the fourth explanation to the user. For example, the user response system 201 may transmit the fourth recommended solution and the fourth explanation to the user device 202 via the network 206.

Figure 1E:
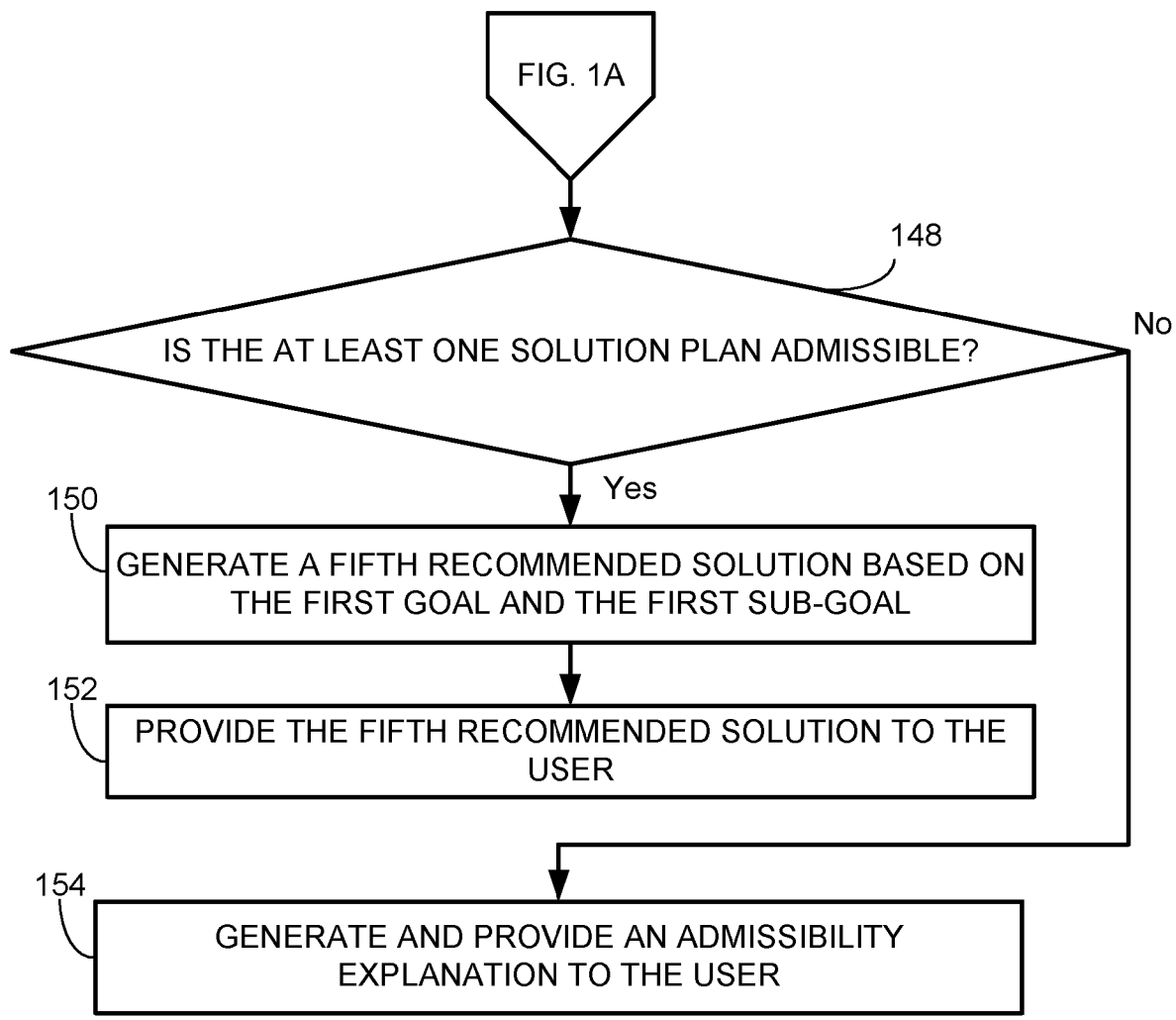

In block 148 in FIG. 1E, the user response system 201 may determine whether the at least one solution plan is admissible. The system may do so by checking whether the solution is feasible given the current circumstances of the customer and of the system, and whether the solution currently meets domain-specific admissibility criteria such as safety and ethical acceptability (depending on the domain, certain solutions may be safe only under specific weather conditions, for example).

When the user response system 201 determines that the at least one plan is admissible and possible, proceed to block 150. When the user response system 201 determines that the at least one plan is not admissible or possible, proceed to block 154.

In block 150, the user response system 201 may generate a fifth recommended solution based on the first goal and the first sub-goal. For example, the fifth recommended solution may be to offer to open a new account with a new customized PIN.

In block 152, the user response system 201 may provide the fifth recommended solution to the user. For example, the user response system 201 may transmit the fifth recommended solution and the fifth explanation to the user device 202 via the network 206.

In block 154, the user response system 201 may generate and provide an admissibility explanation to the user. For example, the user response system 201 may generate the statement "Unfortunately, we cannot create a new account because your credit score does not meet the requirements for a new account."

Figure 1F:
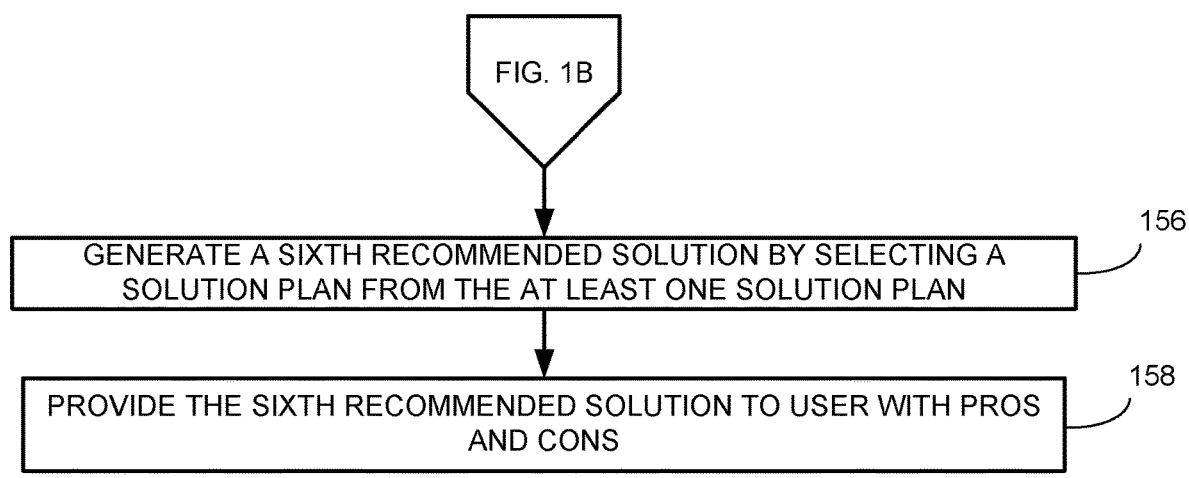

In block 156 in FIG. 1F, the user response system 201 may generate a sixth recommended solution by selecting a solution plan from the at least one solution plan. For example, the user response system 201 may generate a solution plan to create a new account without creating a new PIN.

In block 158, the user response system 201 may provide the sixth recommended solution to the user with pros and cons. For example, the user response system 201 may transmit the sixth recommended solution and the sixth explanation to the user device 202 via the network 206. The pros and cons may be a sixth explanation. For example, the sixth explanation may include the following statement "Although an account can be created with a PIN, it is best to set up a PIN for new accounts at a later date for security reasons."

Figure 2:
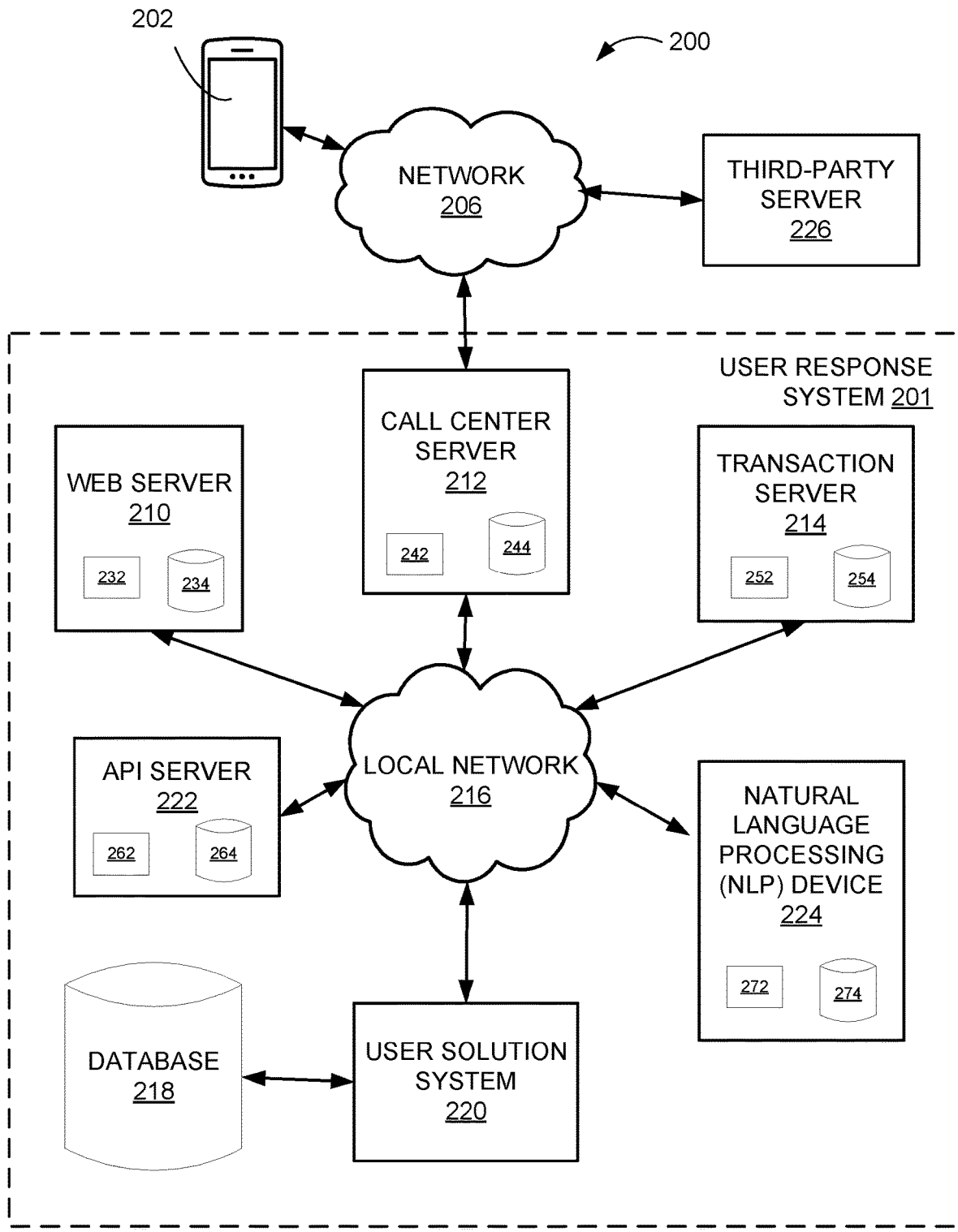
FIG. 2 is a block diagram of an example system 201 that may identify user goals and sub-goals and generate responses to users based on the goals and sub-goals, during an automated user service interaction.

FIG. 2 is a block diagram of an example system 200 that may be used to autonomously identify user goals and sub-goals and generate responses to users based on the goals and sub-goals. The system 200 may be configured to perform one or more processes that can adaptively generate responses based on an evolving context associated with user interactions, orders, goods, services, etc. The components and arrangements shown in FIG. 2 are not intended to limit the disclosed embodiments as the components used to implement the disclosed processes and features may vary. As shown, system 200 may interact with a user device 202 via a network 206. In certain example implementations, the system 200 may include a web server 210, a call center server 212, a transaction server 214, a local network 216, a user solution system 120, a database 218, an API server 222, and an Natural Language Processing (NLP) device 224 (which may be referred to herein as an NLP device).

In some embodiments, a user may operate the user device 202. The user device 202 can include one or more of a mobile device, smart phone, general purpose computer, tablet computer, laptop computer, telephone, PSTN landline, smart wearable device, voice command device, other mobile computing device, or any other device capable of communicating with the network 206 and ultimately communicating with one or more components of the user response system 201. In some embodiments, the user device 202 may include or incorporate electronic communication devices for hearing or vision impaired users.

Users may include individuals such as, for example, subscribers, clients, prospective clients, or users of an entity associated with an organization, such as individuals who have obtained, will obtain, or may obtain a product, service, or consultation from an entity associated with the system 200. According to some embodiments, the user device 202 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

The network 206 may be of any suitable type, including individual connections via the internet such as cellular or WiFi networks. In some embodiments, the network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 206 may include any type of computer networking arrangement used to exchange data. For example, the network 206 may be the Internet, a private data network, virtual private network using a public network, and/or other suitable connection(s) that enable(s) components in the system 200 environment to send and receive information between the components of the system 200. The network 206 may also include a public switched telephone network ("PSTN") and/or a wireless network.

In accordance with certain example implementations, a third-party server 226 may be in communication with the system 200 via the network 206. In certain implementations, the third-party server 226 can include a computer system associated with an entity (other than the entity associated with the system 200 and its users) that performs one or more functions associated with the users. For example, the third-party server 226 can include an automated teller machine (ATM) system that allows a user to withdraw money from an account managed via an organization that controls the user response system 201. As another example, the third-party server 226 may include a computer system associated with a product repair service that submits a warranty claim for a product that a user purchased from the organization that controls the user response system 201.

The user response system 201 may be associated with and optionally controlled by an entity such as a business, corporation, individual, partnership, or any other entity that provides one or more of goods, services, and consultations to individuals such as users. The user response system 201 may include one or more servers and computer systems for performing one or more functions associated with products and/or services that the organization provides. Such servers and computer systems may include, for example, the web server 210, the call center server 212, and/or the transaction server 214, as well as any other computer systems necessary to accomplish tasks associated with the organization or the needs of users (which may be users of the entity associated with the organization). The web server 210 may include a computer system configured to generate and provide one or more websites accessible to users, as well as any other individuals involved in an organization's normal operations. The web server 210, for example, may include a computer system configured to receive communications from the user device 202 via for example, a mobile application, a chat program, an instant messaging program, a voice-to-text program, an SMS message, email, or any other type or format of written or electronic communication. The web server 210 may have one or more processors 232 and one or more web server databases 234, which may be any suitable repository of website data. Information stored in the web server 210 may be accessed (e.g., retrieved, updated, and added to) via the local network 216 (and/or the network 206) by one or more devices (e.g., the user solution system 220 and/or the NLP device 224) of the user response system 201. In some embodiments, one or more processors 232 may be used to implement an automated natural language dialogue system that may interact with a user via different types of communication channels such as a website, mobile application, instant messaging application, SMS message, email, or any other type of electronic communication. When receiving an incoming message from, for example, the user device 202 of a user, the web server 210 may be configured to determine the type of communication channel the user device 202 used to generate the incoming message.

The call center server 212 may include a computer system configured to receive, process, and route telephone calls and other electronic communications between a user operating a user device 202 and the user solution system 220. The call center server 212 may have one or more processors 242 and one or more call center databases 244, which may be any suitable repository of call center data. Information stored in the call center server 212 may be accessed (e.g., retrieved, updated, and added to) via the local network 216 (and/or network 206) by one or more devices of the user response system 201. In some embodiments, the call center server processor 242 may be used to implement an interactive voice response (IVR) system that interacts with the user over the phone.

The transaction server 214 may include a computer system configured to process one or more transactions involving an account associated with users, or a request received from users. In some embodiments, transactions can include, for example, a product/service purchase, product/service return, financial transfer, financial deposit, financial withdrawal, financial credit, financial debit, dispute request, warranty coverage request, shipping information, delivery information, and any other type of transaction associated with the products and/or services that an entity associated with user response system 201 provides to individuals such as users. The transaction server 214 may have one or more processors 252 and one or more transaction server databases 254, which may be any suitable repository of transaction data. Information stored in transaction server 214 may be accessed (e.g., retrieved, updated, and added to) via the local network 216 (and/or network 206) by one or more devices of the user response system 201.

In some embodiments, the transaction server 214 tracks and stores event data regarding interactions between a third-party, such as a third-party server 226, with the user response system 201, and on behalf of the individual users. For example, the transaction server 214 may track third-party interactions such as purchase requests, refund requests, shipping status, shipping charges, warranty claims, account withdrawals and deposits, and any other type of interaction that the third-party server 226 may conduct with the user system 201 on behalf of an individual such as user.

The local network 216 may include any type of computer networking arrangement used to exchange data in a localized area, such as WiFi, Bluetooth™ Ethernet, and other suitable network connections that enable components of the user response system 201 to interact with one another and to connect to the network 206 for interacting with components in the user response system 201 environment. In some embodiments, the local network 216 may include an interface for communicating with or linking to the network 206. In other embodiments, certain components of the user response system 201 may communicate via the network 206, without a separate local network 216.

In accordance with certain example implementations of the disclosed technology, the user solution system 220, which is described more fully below with reference to FIG. 3, may include one or more computer systems configured to compile data from a plurality of sources, such as the web server 210, the call center server 212, the transaction server 214, and/or the database 218. The user solution system 220 may correlate compiled data, analyze the compiled data, arrange the compiled data, generate derived data based on the compiled data, and store the compiled and derived data in a database such as the database 218. According to some embodiments, the database 218 may be a database associated with an organization and/or a related entity that stores a variety of information relating to users, transactions, and business operations. The database 218 may also serve as a back-up storage device and may contain data and information that is also stored on, for example, databases 234, 244, 254, 264, 274 (and 380, as will be discussed with reference to FIG. 3). The database 218 may be accessed by the user solution system 120 and may be used to store records of every interaction, communication, and/or transaction a particular user has had with the organization associated with user response system 201 and/or its related entity in the past to enable the creation of an ever-evolving user context that may enable the user solution system 220, in conjunction with the NLP device 224, to generate and provide interactions with the user.

In certain example implementations, the API server 222 may include a computer system configured to execute one or more application program interfaces (APIs) that provide various functionalities related to the operations of the user response system 201. In some embodiments, the API server 222 may include API adapters that enable the API server 222 to interface with and utilize enterprise APIs maintained by an organization and/or an associated entity that may be housed on other systems or devices. In some embodiments, APIs can provide functions that include, for example, retrieving user account information, modifying user account information, executing a transaction related to an account, scheduling a payment, authenticating a user, updating a user account to opt-in or opt-out of notifications, and any other such function related to management of user profiles and accounts. The API server 222 may include one or more processors 262 and one or more API databases 264, which may be any suitable repository of API data. Information stored in the API server 222 may be accessed (e.g., retrieved, updated, and added to) via the local network 216 (and/or network 206) by one or more systems or devices (e.g., user solution system 120) of user response system 201. In some embodiments, the API processor 262 may be used to implement one or more APIs that can access, modify, and retrieve user account information.

In certain embodiments, real-time APIs consistent with certain disclosed embodiments may use Representational State Transfer (REST) style architecture, and in this scenario, the real time API may be called a RESTful API.

In certain embodiments, a real-time API may include a set of Hypertext Transfer Protocol (HTTP) request messages and a definition of the structure of response messages. In certain aspects, the API may allow a software application, which is written against the API and installed on a client (such as, for example, the transaction server 214) to exchange data with a server that implements the API (such as, for example, the API server 222), in a request-response pattern. In certain embodiments, the request-response pattern defined by the API may be configured in a synchronous fashion and may require that the response be provided in real-time. In some embodiments, a response message from the server to the client through the API consistent with the disclosed embodiments may be in formats including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). In certain example implementations, the client may send GET and POST requests with JSON serialized parameters in the body. Preferably, the requests with JSON serialized parameters use "application/json" content-type. In another aspect, an API design may also require the server implementing the API return messages in JSON format in response to the request calls from the client.

In accordance with certain example implementations of the disclosed technology, the NLP device 224 may include a computer system configured to receive and process incoming messages and determine a meaning of the incoming message. For example, the NLP device 224 may be configured to receive and execute commands (for example, from the user solution system 220) that instructs the NLP device 224 to determine the meaning of the incoming dialogue message. In certain example implementations, the user solution system 220 may issue dialog modifying commands to the NLP device 224, for example, that instruct the NLP device 224 to formulate/revise a response based on rules and/or determined information related to the user interaction, specifics related to an order, etc. Thus, in certain example implementations, the user solution system 220 may program the NLP device 224.

As will be discussed further below (with reference to FIG. 4), the NLP device 224 may be configured to continuously or intermittently listen for and receive commands from a command queue to determine if there are any new commands directed to the NLP device 224. Upon receiving and processing an incoming dialogue message, the NLP device 224 may output the meaning of an incoming dialogue message in a format that other devices can process. For example, the NLP device 224 may receive an incoming message stating: "I've switched to the paperless option and I can't access my documents online. Please switch me back to paper documents!" and may determine that this statement represents a goal (wants to access documents) and a sub-goal (wants to be switched back to paper documents rather than having the paperless option). The NLP device 124 may be configured to output an event representing the meaning (goals/sub-goals) of the incoming message to an event queue for processing by another device of the user response system 201. In some embodiments, the NLP device 224 may be configured to generate a natural language phrase in response to receiving a command. Accordingly, in some embodiments, the NLP device 224 may be configured to output an event that contains data representing natural language.

The NLP device 224 may include one or more processors 272 and one or more NLP databases 274, which may be any suitable repository of NLP data. Information stored in the NLP device 224 may be accessed (e.g., retrieved, updated, and added to) via the local network 216 (and/or network 206) by one or more devices (e.g., the user solution system 220) of system 100. In some embodiments, the NLP processor 272 may be used to implement an NLP system that can determine the meaning behind a string of text and convert it to a form that can be understood by other devices.

Although the preceding description describes various functions of the web server 210, the call center server 212, the transaction server 214, the user solution system 220, the database 218, the API server 222, and the NLP device 224, in some embodiments, some or all of these functions may be carried out by a single computing device.

For ease of discussion, embodiments may be described in connection with the generation of automated natural language dialogue in response to an electronic text communication such as an SMS message, chat program message, or an email. It is to be understood, however, that disclosed embodiments are not limited to discourse and/or dialogue in response to written electronic messages and may be used in many other contexts, such as, for example, generating automated natural language dialogue in response to an oral communication such as a phone call. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

FIG. 2 is a block diagram (with additional details) of the example user solution system 220, as also depicted in FIG. 2. According to some embodiments, the user device 202, the web server 210, the call center server 212, the transaction server 214, the API server 222, the NLP device 224, and the third-party server 226, as depicted in FIG. 1, may have a similar structure and components that are similar to those described with respect to user solution system 220 shown in FIG. 3. As shown, the user solution system 220 may include a processor 310, an input/output ("I/O") device 320, a memory 330 containing an operating system ("OS") 340 and a program 30. In certain example implementations, the user solution system 220 may be a single server or may be configured as a distributed computer system including multiple servers or computers that interoperate to perform one or more of the processes and functionalities associated with the disclosed embodiments. In some embodiments, the user solution system 220 may further include a peripheral interface, a transceiver, a mobile network interface in communication with the processor 310, a bus configured to facilitate communication between the various components of the user solution system 220, and a power source configured to power one or more components of the user solution system 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Pentium™ family manufactured by Intel™ or the Turion™ family manufactured by AMD™. The processor 310 may constitute a single core or multiple core processor that executes parallel processes simultaneously. For example, the processor 310 may be a single core processor that is configured with virtual processing technologies. In certain embodiments, the processor 310 may use logical processors to simultaneously execute and control multiple processes. The processor 310 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the user solution system 220 may include one or more storage devices configured to store information used by the processor 310 (or other components) to perform certain functions related to the disclosed embodiments. In one example, the user solution system 220 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the user solution system 220 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the user solution system 220 may include the memory 330 that may include one or more programs 350 to perform one or more functions of the disclosed embodiments. For example, in some embodiments, the user solution system 220 may additionally manage dialogue and/or other interactions with the user via a program 350.

In certain example implementations, the program 350 may include a rule-based platform 390 for generating zero or more commands in response to processing an event in accordance with a set of predefined rules. In some embodiments, the user solution system 220 may include a trained machine learning model 395 for generating zero or more commands in response to processing an event, in accordance with a model that may be continuously or intermittently updated. Moreover, the processor 310 may execute one or more programs 350 located remotely from the user solution system 220 or user response system 201 (as shown in FIG. 1). For example, the user solution system 220 may access one or more remote programs 350 (such as the rule-based platform 390 or the trained machine learning model 395), that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a user information database 280 for storing related data to enable the user solution system 220 to perform one or more of the processes and functionalities associated with the disclosed embodiments.

The user information database 380 may include stored data relating to a user profile and user accounts, such as for example, user identification, name, age, sex, birthday, address, account status, preferences, preferred language, greeting name, preferred communication channel, account numbers, order history, delivery history, authorized users associated with one or more accounts, account balances, account payment history, and other such typical account information. The user information database 380 may further include stored data relating to previous interactions between the organization (or its related entity) and a user. For example, the user information database 380 may store user interaction data that includes records of previous user service interactions with a user via a website, SMS, a chat program, a mobile application, an IVR system, or notations taken after speaking with a user service agent. The user information database 380 may also include information about business transactions between the organization (or its related entity) and a user that may be obtained from, for example, the transaction server 214.

The user information database 380 may also include user feedback data such as an indication of whether an automated interaction with a user was successful, online surveys filled out by a user, surveys answered by a user following previous interactions to the company, digital feedback provided through websites or mobile applications associated with the organization or its related entity (e.g., selecting a smiley face or thumbs up to indicate approval), reviews written by a user, complaint forms filled out by a user, information obtained from verbal interactions with user (e.g., information derived from a transcript of a user service call with a user that is generated using, for example, voice recognition techniques) or any other types of communications from a user to the organization or its related entity. According to some embodiments, the functions provided by the user information database may also be provided by a database that is external to the user solution system 320, such as the database 218 as shown in FIG. 2.

As will be discussed further below (with reference to FIG. 4), the memory 330 may also include an event queue 360 for temporarily storing queued events and a command queue 370 for temporarily storing queued commands. The processor 310 may receive events from the event queue 360 and in response to processing the event using the rule-based platform 390 and/or the trained machine learning model 395, may generate zero or more commands to be output to the command queue 370. According to some embodiments, the user solution system 220 may place commands in the command queue 370 in the order they are generated. Each command may be designated to be executed by one or more devices, such as, for example, the web server 210, the call center server 212, the transaction server 214, the API server 222, or the NLP device 224 as shown in FIG. 2. Each such device (such as, for example, the API server 222 or NLP device 224) may continuously or intermittently monitor the command queue 370 to detect commands that are designated to be executed by the monitoring device and may access pertinent commands. The event queue 360 may receive events from other devices such as, for example, the user device 202, the web server 210, the call center server 212, the transaction server 214, the API server 222, and the NLP device 224 as shown in FIG. 2. According to some embodiments, events may be placed in the event queue 360 in a first-in first-out (FIFO) order, such that events may then be processed by the user solution system 220 in the order they are received or generated.

The user solution system 220 may also be communicatively connected to one or more memory devices (e.g., databases) locally or through a network. The remote memory devices may be configured to store information and may be accessed and/or managed by the user solution system 220. By way of example, the remote memory devices may be document management systems, Microsoft™ SQL databases, SharePoint™ databases, Oracle™ databases, Sybase™ databases, or other relational or non-relational databases. Systems and methods consistent with disclosed embodiments, however, are not limited to separate databases or even to the use of a database.

The user solution system 220 may also include one or more I/O devices 320 that may comprise one or more interfaces for receiving signals or input from devices and providing signals or output to one or more devices that allow data to be received and/or transmitted by the user solution system 220. For example, the user solution system 220 may include interface components, which may provide interfaces to one or more input devices, such as one or more keyboards, mouse devices, touch screens, track pads, trackballs, scroll wheels, digital cameras, microphones, sensors, and the like, that enable the user solution system 220 to receive data from one or more users (such as, for example, via the user device 202).

In example embodiments of the disclosed technology, the user solution system 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the user solution system 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the user solution system 220 may include a greater or lesser number of components than those illustrated.

Figure 3:
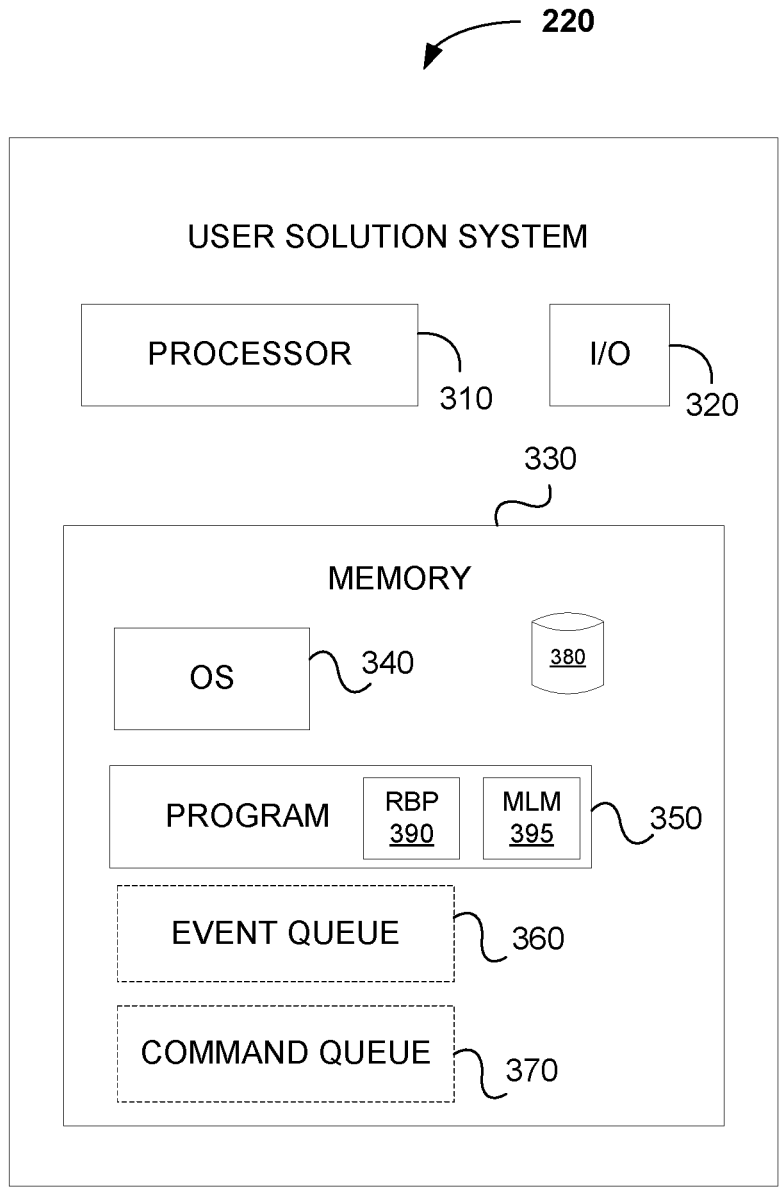
FIG. 3 is a block diagram of an example user solution system 220, as also shown in FIG. 2.
Figure 4:
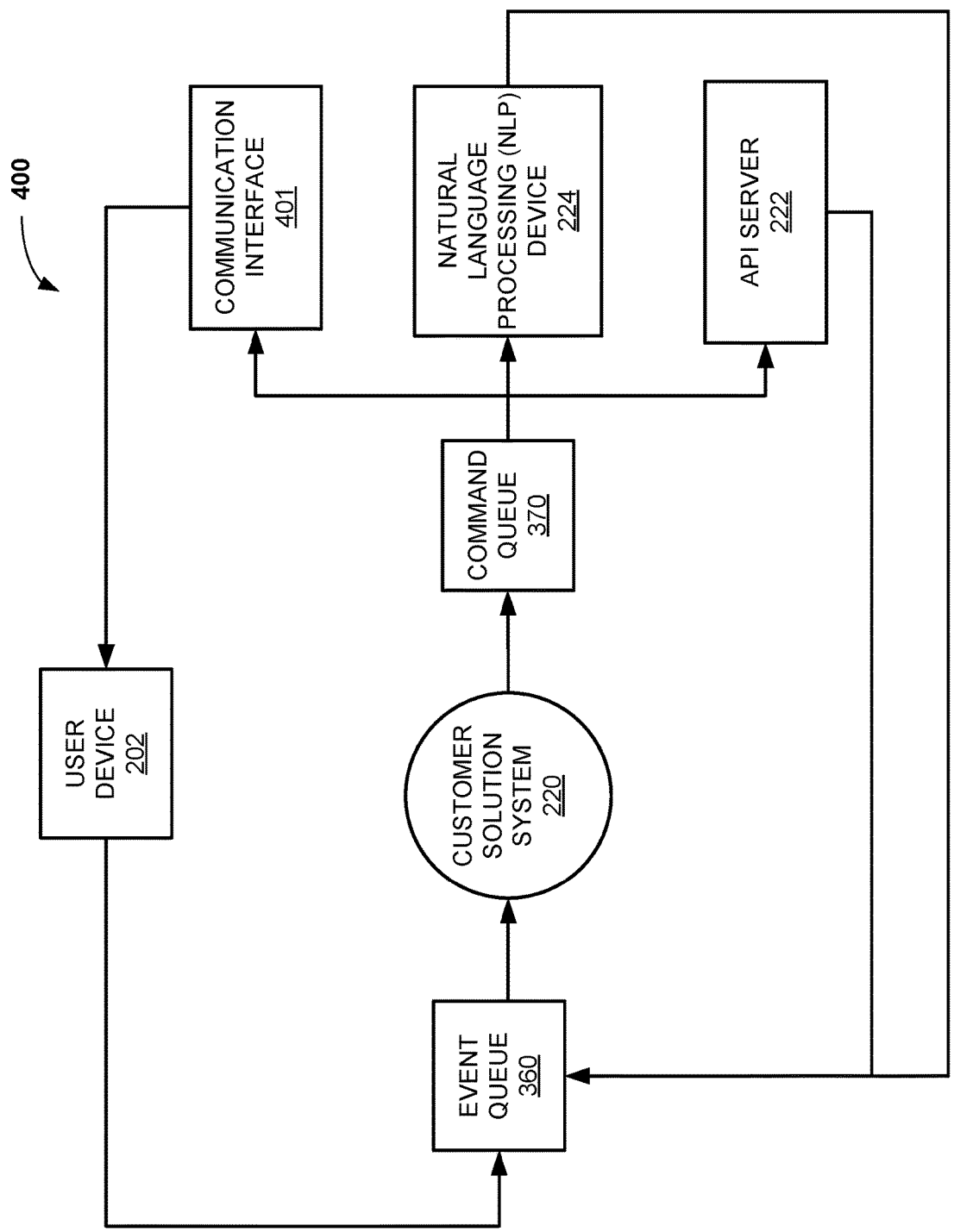
FIG. 4 is a block diagram depicting functionality 400 for autonomously identifying user goals and sub-goals and generating responses to users based on the goals and sub-goals, in accordance with an example implementation of the disclosed technology.

FIG. 4 is a block diagram 400 depicting example system functionality for autonomously identifying user goals and sub-goals and generating responses to users based on the goals and sub-goals during an automated user service interaction. In certain example implementations, the user solution system 220 may work in conjunction with the NLP device 224 via queues and feedback loops to: (a) autonomously interpret utterances/messages received from the user device 202; (b) gather information pertinent to the interpreted utterances/messages; and (c) program the NLP device 224 (via commands) throughout the interaction(s) that may ultimately lead to responding to a user based on their goal and sub-goal, and in some instances, resolving acting to achieve the user's goal. The methods disclosed herein may correspond to the block diagram 400 shown in FIG. 4, and may be performed by user response system 201 as discussed above and shown in FIG. 2 entirely or partially via the user solution system 220 using the processor 310 to execute memory 330 as shown in FIG. 3, and optionally with other steps delegated to other elements in system 200, such as the user device 202, the web server 210, the call center server 212, the transaction server 214, the API server 222, and/or the NLP device 224.

Responsive to receiving incoming user messages from the user device 202 (and/or other events placed in the event queue 360), the user solution system 120 may generate and provide programming commands to the NLP device 224 via the command queue 370. The programming commands, for example, may cause the NLP device 224 to identify one or more candidate responses based on the interpreted contents of the incoming user message. In certain implementations, a candidate response may be identified and output in the form of a specific response via the communication interface 401. In another example implementation, the candidate response may be identified and ultimately refined based on further information received from the user solution system 220 (such as order status, delivery proof, paperless option status, rules, etc.) and output as a meaningful response to the incoming user message. In certain example implementations, the candidate response may be identified and a resolution to the user based on the user's goal and/or sub-goal may be initiated.

In certain example implementations, there can be a pre-established solution space from which responses or resolution measures may be generated. In certain example implementations, the generated response can be a natural-language construct including confirmations and/or corrections of verifiable assertions.

In certain example implementations, the user solution system 220 in conjunction with the NLP device 224 may be utilized to elicit additional information relevant to the initial message received from the user when insufficient information is available to generate a candidate response. For example, the NLP device 224 may be instructed by the user solution system 220 to conduct additional dialogue with the user (via the user device 202) to: elicit relevant missing information, generate specific information-eliciting utterances, acquire supporting evidence, acquire contrary evidence, abandon a candidate response, refine a candidate response, and/or commit to a response.

In certain example implementations, the NLP device 224 may be instructed by the user solution system 220 to generate and provide a response based solely on the initial message received from the user, particularly if the initial message received includes verifiable assertions that can be processed by the user solution system 220.

In certain example implementations, the response may be output via the communication interface 401 in the form of textual, audible, and/or video information that is sent to the user for display/output on the user device 202 associated with the user. In other example implementations, a resolution may consist of the decision to issue a refund, place an order for one or more products or services from a selected merchant for sending to the user, or present instructions to the user on how to achieve their goal.

With continued reference to FIG. 4, a first event may be generated and placed in the event queue 360 in response to receiving a user message. The event, for example, may be generated based on receiving a user message sent via the user device 202. A user message may be received via various communication mediums such as, for example, SMS, a voice-to-text device, a chat application, an instant messaging application, a mobile application, an IVR system, or any other such medium that may be sufficient to send and/or receive electronic communications. In some embodiments, the incoming message may be received by a device of the user response system 201, as discussed above with respect to FIG. 2, such as web server 210, call center server 212, API server 222, etc. An event may be generated by, for example, a RESTful API interfacing with the receiving device.

In certain example implementations, the event queue 360 may be configured to temporarily store a plurality of events. According to some embodiments, events are placed in the event queue in a first-in first-out (FIFO) manner, such that the events will be executed in the order that they were received. In some embodiments, the event queue 360 and/or the command queue 270 may be part of user solution system 220. In some embodiments, both the event queue 360 and the command queue 370 may be present on a device or component other than the user solution system 220. For example, in some examples, the event queue 360 and the command queue 370 may be maintained on a cloud server that is accessible by the user solution system 220, the API server 222, the NLP device 224, and/or the communication interface 401. According to some embodiments, an event may represent different types of information that can trigger or present an opportunity to respond to a received message.

According to some embodiments, the user solution system 220 may continuously or intermittently monitor the event queue 360. In response to detecting an event (e.g., the first event) in the event queue, the event may be received at the user solution system 220 from the event queue 360. In some embodiments, the user solution system 220 may include a rule-based platform, a trained machine learning model, and/or a database storing user context/order information that may be derived from user information associated with one or more users that is stored in other databases such as, for example, the database 218 and/or database 380 as discussed above with respect to FIG. 2 and/or FIG. 3. In some embodiments, the user information may include one or more of account types, account statuses, transaction history, order status, delivery tracking status, proof of delivery, and conversation history. According to an example implementation of the disclosed technology, the user context/order information may allow the user response system 201 to generate customized responses for one or more users. According to some embodiments, the user context/order information may be updated by the user solution system 220 upon receiving updated user or order information from, for example, the database 218.

The user solution system 220 may, in response to processing the first event, generate a first command to be placed in a command queue 370. According to some embodiments, the user solution system 220 may generate a command based on the processed event and/or the user context/order information using one or more of a rule-based platform 390 and a trained machine learning model 395, as discussed above with reference to FIG. 3. For example, in some use cases a command may be generated using the rule-based platform 390, whereas in other use cases, a command may be generated using the trained machine learning model 395, and further use cases may be handled by both working in concert. In some embodiments, the trained machine learning model 395 may be used as a way of enhancing the performance of the rule-based platform 390 by, for example, determining which rules have priority over other rules and what rules should be applied in a given context. According to some embodiments, the commands generated by the user solution system 220 in response to a particular event may change as the user context/order information is updated over time. Further, changes to the rules in the rule-based platform 390 or further training of the machine learning model 395 may also result in different commands being generated in response to the same event based on previous results (e.g., successful resolution of a user's issue).

According to some embodiments, and in reference to the user solution system 220 discussed in FIG. 2, FIG. 3, and FIG. 4, the trained machine learning model 395 may be trained by updating an NLP database 274 (as discussed above with respect to FIG. 2) with communications from users that have been labeled using, for example, a web user interface. The data in the NLP database 274 may undergo supervised training in a neural network model using a neural network training algorithm while the model is offline before being deployed in the user response system 201. According to some embodiments, an NLP model of the user response system 201 may utilize deep learning models such as a convolutional neural network (CNN) that transforms a word into a word vector and long short-term memory (LSTM) that transforms a sequence of word vectors into an intent. The NLP model may also be trained to recognize named entities in addition to intents. For example, a named entity may include persons, places, organizations, account types, and product types. According to some embodiments, when the user solution system 220 generates a command, such as a first command, it may determine an entity that will execute the command, such as, for example, the API server 222, the NLP device 224, a communication interface 401, or some other device or component, such that only the determined type of entity may pull the command from the command queue 370. For example, in the embodiment shown in FIG. 4, the user solution system 220 may determine that the first command is to be executed by the NLP device 224 in order to determine the meaning of the incoming user message. According to some embodiments, at the time the user solution system 220 creates a new command, the user solution system 220 may also update the user information database 380 (or alternatively, external database 218) with information about a previous or concurrent transaction or user interaction.

In certain example implementations, the NLP device 224 may receive the first command from the command queue 370, execute the command, and generate a second event to be placed in the event queue 360. According to some embodiments, the NLP device 224 may continuously or intermittently monitor the command queue 370 to detect new commands and upon detecting a new command, may receive the command from the command queue 370. Upon receiving a command, the NLP device 224 may perform various functions depending on the nature of the command. For example, in some cases, NLP device 224 may determine the meaning of an incoming message in response to executing the command. According to some embodiments, NLP device 224 may determine the meaning of an incoming message and/or additional dialogue by utilizing one or more of the following artificial intelligence (AI) techniques: intent classification, named entity recognition, sentiment analysis, relation extraction, semantic role labeling, question analysis, rule extraction and discovery, and story understanding.

Intent classification may include mapping text, audio, video, or other media into an intent chosen from a set of intents, which represent what a user is stating, uttering, requesting, commanding, asking, or promising in, for example, an incoming user message. Intent classifications may include, for example, a request for an action (e.g., an order or a change in profile status), a request for a confirmation, an indication of satisfaction, or any other intent a user may have in communicating a message. Named entity recognition may involve identifying named entities such as persons, places, organizations, account types, and product types in text, audio, video, or other media.

Sentiment analysis may involve mapping text, audio, video, or other media into an emotion chosen from a set of emotions. For example, a set of emotions may include positive, negative, anger, anticipation, disgust, distrust, fear, happiness, joy, sadness, surprise, and/or trust. Relation extraction may involve identifying relations between one or more named entities in text, audio, video, or other media. A relation may be for example, a "user of" relation that indicates that a person is a user of an organization. Semantic role labeling may involve identifying predicates along with roles that participants play in text, audio, video, or other media. An example of semantic role labeling may be identifying (1) the predicate Eat, (2) Tim, who plays the role of Agent, and (3) orange, which plays the role of Patient, in the sentence "Tim ate the orange." Question analysis may involve performing natural language analysis on a question, including syntactic parsing, intent classification, semantic role labeling, relation extraction, information extraction, classifying the type of question, and identifying what type of entity is being requested.

Rule extraction and discovery may involve extracting general inference rules in text, audio, video, or other media. An example of rule extraction may be extracting the rule that "When a person turns on a light, the light will light up" from "Matt turned on the light, but it didn't light up." Story understanding may involve taking a story and identifying story elements including (1) events, processes, and states, (2) goals, plans, intentions, needs, emotions, and moods of the speaker and characters in the story, (3) situations and scripts, and (4) themes, morals, and the point of the story.

In some cases, the NLP device 224 may perform natural language generation in response to receiving a command. According to some embodiments, the NLP device 224 may perform natural language generation by utilizing one or more of the following AI techniques: content determination, discourse structuring, referring expression generation, lexicalization, linguistic realization, explanation generation.

Content determination may involve deciding what content to present to the user out of all the content that might be relevant. Discourse structuring may involve determining the order and level of detail in which content is expressed. Referring expression generation may involve generating expressions that refer to entities previously mentioned in a dialogue. Lexicalization may involve deciding what words and phrases to use to express a concept. Linguistic realization may involve determining what linguistic structures, such as grammatical constructions, to use to express an idea. Explanation generation may involve generating a humanly-understandable, transparent explanation of a conclusion, chain of reasoning, or result of a machine learning model. In the example embodiment shown in FIG. 4, the NLP device 224 may determine the meaning of the incoming user message and convert it to a form that may be processed by the user solution system 220. Accordingly, the second event generated by the NLP device 224 may represent a determined meaning of the incoming user dialogue message and the NLP device 224 may send the second event to the event queue 360.

The user solution system 220 may receive the second event from the event queue 360 in response to detecting it, as described above with respect to the user solution system's 220 receipt of the first event. In some embodiments, the user solution system 220 may also update the user context/order information at this point by receiving updated user information from, for example, the database 218. The user solution system 220 may, in response to processing the second event, generate a second command to be placed in a command queue 370. According to some embodiments, the user solution system 220 may generate the second command based on the processed event, the user context/order information, and using one or more of a rule-based platform 390 and a trained machine learning model 395 as described above. In the example embodiment shown in FIG. 4, the second event may represent a user's request to switch to paper documents because the user cannot access their documents online or a request to make a meal plan that is limited to 800 calories per day because the user wants to lose weight. Based on the user context/order information, the rule-based platform 390 and/or trained machine learning model 395, the user solution system 220 may decide, for example, using predictive analytics, that it has enough information to create a second event that represents instructions to an API associated with the API server 222 to look up order information related to the user and/or policy information related to the order. However, in some embodiments, the user solution system 220 may decide that, for example, it requires more information and may instead create a second event that represents instructions to communication interface 401 to send a message to user device 202 requesting more information. Accordingly, based on the user context/order information, the rule-based platform 390, and the trained machine learning model 395, the user solution system 220 may change or adapt its responses to a given request over time.

The user solution system 220 may, in response to processing the second event, generate a second command to be placed in command queue 370. According to some embodiments, the user solution system 220 may generate the second command based on the processed event, the user context/order information, and using one or more of rule-based platform 390 and trained machine learning model 395 in a fashion similar to the generation of the first command described above. According to some embodiments, the second command may represent a command to the API server 222 to retrieve user information, such as, for example, shipping amounts, order contents, delivery details, etc.

In some embodiments, the API server 222 may receive the second command from the command queue 370, execute the command, and generate a third event to be placed in the event queue 360. According to some embodiments, the API server 222 may continuously or intermittently monitor the command queue 370 to detect new commands and, upon detecting a new command, may receive the command from the command queue 370. Upon receiving a command, the API server 222 may perform various functions depending on the nature of the command. In some cases, the API server 222 may call up an API stored locally or remotely on another device, to retrieve user/order data, perform an account action (e.g., initiate a refund), and/or respond with an explanation for the perceived discrepancy. Accordingly, the third event may represent, for example, retrieved information, an acknowledgement of the discrepancy, explanation for the perceived discrepancy, etc.

The user solution system 220 may receive the third event from the event queue 360 in response to detecting it as described above. In some embodiments, the discrepancy determination device 220 may also update the user context/order information at this point by receiving updated user information from, for example, the database 218.

The user solution system 220 may, in response to processing the third event, generate a third command to be placed in the command queue 370. According to some embodiments, the user solution system 220 may generate the third command based on the processed third event and/or the user context/order information using one or more of the rule-based platform 390 and the trained machine learning model 395 in a fashion like the generation of the first command described above. In some embodiments, the user solution system 220 may also generate a response message in response to processing an event, such as the third event. In some embodiments, the user solution system 220 may receive a response message as an event produced by the NLP device 224. According to some embodiments, the third command may represent a command or instruction to the communication interface 401 to transmit the response dialogue message to, for example, the user device 202.

The communication interface 401 may receive and execute the third command, which may cause the communication interface 401 to transmit (e.g., via SMS) the response message to user device 202. In some embodiments, the communication interface 401 may continuously or intermittently monitor the command queue 370 for new commands and may receive the third command in response to detecting the third command in the command queue 370. According to some embodiments, the communication interface 401 may be a standalone device having some or all of the elements of the user solution system 220 as shown in FIG. 3. In some embodiments, the communication interface 401 may be integrated into user solution system 220 (e.g., as I/O device 320). In some embodiments, the communication interface 401 may be integrated into another device, such as, for example, the web server 210, the call center server 212, the transaction server 214, the API server 222, and/or the NLP device 224.

As shown in the example embodiments in FIG. 4 (and with implied reference to FIG. 2) the user response system 201 may autonomously exchange messages or conduct dialogue with a user (e.g., user device 202) utilizing the structure provided by the event queue 360, the user solution system 220, the command queue 370, the API server 222, the NLP device 224, and the communication interface 401 to identify one or more triggers or opportunities to provide a response or conduct another action in response to a user dialogue. That is, the user response system 201 may determine whether each event received by the user solution system 220 triggers a discrepancy determination process (e.g., by identifying one or more triggers) in addition to continuing a dialogue with the user. As part of this process, the user response system 201 may adaptively respond to user messages to leverage AI in the machine learning models and NLP device(s) to adaptively respond to user communications using natural language before and/or after identifying triggers to provide a response or to conduct another action in furtherance of the user's goal. Further, repeatedly updating a user context/order information may enable the user response system 201 to provide customized responses to individual users over time. Thus, in certain example implementations, by applying AI and/or machine-learning via the NLP device 224, and by repeatedly updating and maintaining the user context/order information (i.e., by the user solution system 220) the user response system 201 may provide adaptive and/or customized responses to individual users based in part on their individual context. While FIG. 4 and the related description appear to show an example of a single cycle of events, it should be appreciated that multiple different cycles of events (with associated feedback) may be processed in parallel by the user solution system 220. In some embodiments, the API server 222, the NLP device 224, and the communication interface 401 may operate asynchronously, which may allow their independent operation, for example, by separately pulling commands from command queue 370. Accordingly, the entire system may be stateless with no side effects to calling a particular function.

Certain example implementations of the disclosed technology may include two types of input: one-sided, non-interactive communication received from a user (such as utterances); and/or interactive, back-and-forth communication (such as a conversation) where a user interacts with the automated user response system 201.

Certain example implementations of the disclosed technology may include solution spaces that are constrained or unconstrained.

Figure 5:
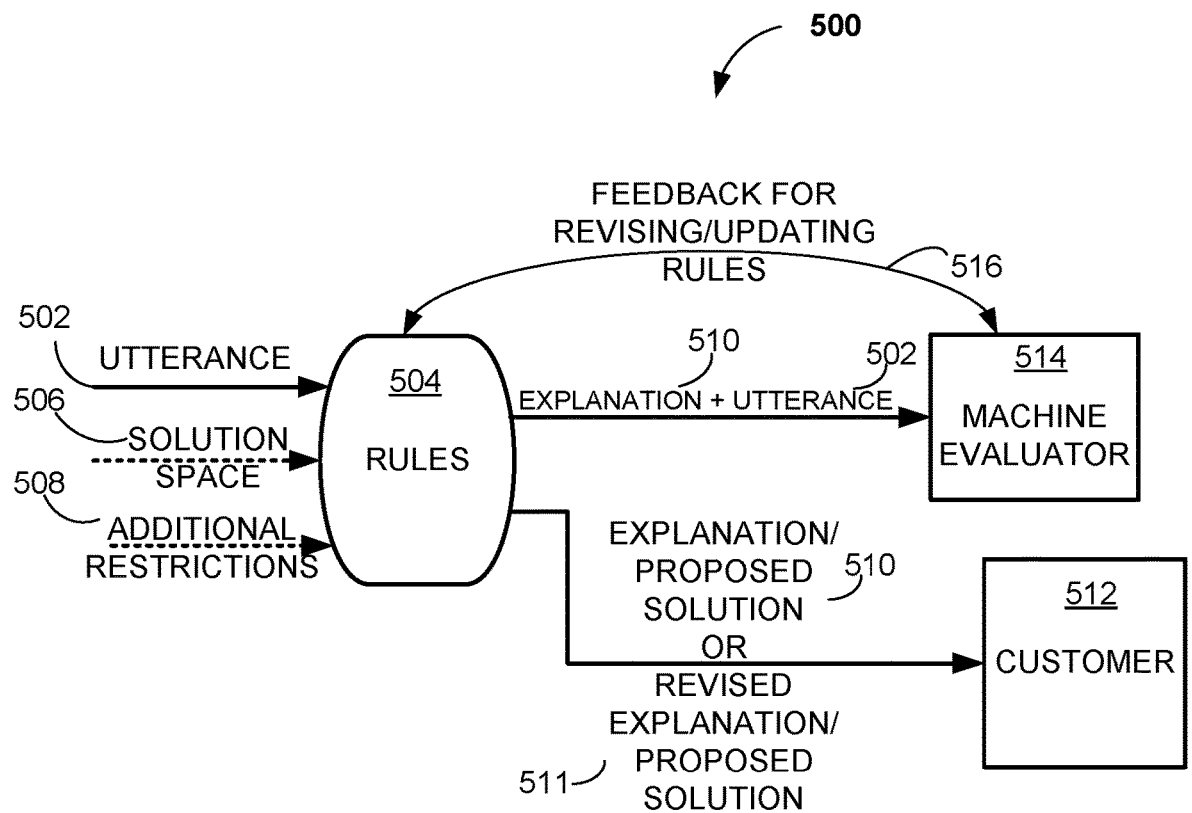
FIG. 5 is an input/output diagram 500 for autonomously evaluating and revising certain rules in the process of autonomously identifying user goals and sub-goals and generating responses to users based on the goals and sub-goals, during an automated user service interaction and in accordance with certain embodiments of the disclosed technology.

FIG. 5 is an input/output diagram 500 illustrating an example process for monitoring automated interactions with a user and updating the rules 504 of the rule-based platform (such as the rule-based platform 390 as discussed above with respect to FIG. 2) in accordance with certain embodiments of the disclosed technology. The dashed lines represent optional input of the solution space 506 and/or additional restrictions 508. According to an example implementation of the disclosed technology, a received utterance 502 may be processed using rules 504 of the rule-based platform 390, and the user response system 201 may output to the user 512 an explanation/proposed solution 510 for achieving the user's goal. In certain example implementations, the explanation/proposed solution 510 and the utterance 502 may also be sent to a machine evaluator 514, which may analyze the explanation/proposed solution 510 in light of the utterance 502 and provide feedback 516 for revising the rules 504 or explanation/proposed solution 510.

In certain example implementations, the utterance 502 and (initial) explanation/proposed solution 510 may be presented to the machine evaluator 514 before an explanation/proposed solution is provided to the user 512, so that a revised explanation/proposed solution 511 may be sent to the user 512 based on updated rules 504. Throughout this process, utterances 502 can be targeted for obtaining further information for generating the explanation/proposed solution 510 or providing a revised explanation/proposed solution 511. In accordance with certain example implementations of the disclosed technology, the explanation/proposed solution 510 or revised explanation/proposed solution 511 may be provided to the user 512 after the conversation/session has ended. According to an example implementation of the disclosed technology, the explanation/proposed solution 510 may be in the form of natural language.

Exemplary Use Cases

The following exemplary use cases describe examples of a typical flow pattern. They are intended solely for explanatory purposes and not in limitation.

In one exemplary use case, a user, Jane, may be having trouble finding statements for her credit card online. Frustrated, Jane decides to talk to customer service via an online chatbot system (e.g., user solution system 220) to request help. Specifically, Jane types "I want to create a new account, so I need to get a new PIN number. I really want a new PIN number, not some other option." Alternatively, Jane could have called and spoken to the user solution system 220 stating the same thing. Regardless of the contact method, the chatbot system (e.g., user solution system 220) may receive the one or more communications (dialogue) from Jane.

In response to receiving the one or more communications from Jane's mobile device 202, the user solution system 220 may retrieve a list of goals form a database (e.g., database 218). The user solution system 220 may normalize, using a rule-based approach, the one or more communications based on the list of goals to generate one or more normalized communications. For example, the user solution system 220 may use the list of goals and sub-goals (and possibility a graph representation of goal/sub-goal relationships) to identify goals within the text or utterance from Jane and replace them with placeholder text (e.g., "I want to create a new account, so I need to get a new PIN number. I really want a new PIN number, not some other option.") becomes "I want to [A], so I need [B]. I really want [B], not some other option." Using a machine learning model, the user solution system 220 may identify a first goal, a first sub-goal, and a preference from the one or more normalized communications (e.g., "I want to [A], so I need [B]. I really want [B], not some other option.") based on the list of goals.

Next, the user solution system 220 may determine whether the list of goals includes the first goal and the first sub-goal. When the list of goals includes the first goal (e.g., creating a new account) and the first sub-goal (e.g., creating a new PIN number), the user solution system 220 may determine whether the first sub-goal (e.g., creating a new PIN number) corresponds to the first goal (e.g., creating a new account) based on the list of goals and potentially a graph representation of goal/sub-goal relationships found in the database. When the list of goals includes the first goal (e.g., creating a new account), the list of goals includes the first sub-goal (e.g., creating a new PIN), and the first sub-goal (e.g., creating a new PIN) corresponds to the first goal (e.g., creating a new account), the user solution system 220 may determine whether the database includes at least one solution plan (e.g., creating the new account) for the first goal (e.g., creating a new account) that does not involve the first sub-goal (e.g., creating a new PIN). When the domain database includes at least one solution plan for the first goal (e.g., creating a new account) that does not involve the first sub-goal (e.g., creating a new PIN) or such a solution plan can be generated through an approach such as first-principles planning, the user solution system 220 may determine whether the one or more normalized communications include an expression of preference for the first sub-goal (e.g., creating a new PIN). When the one or more normalized communications include such an expression of preference (e.g., Jane indicated a preference by stating "I really want a new PIN number, not some other option.") for the first sub-goal (e.g., creating a new PIN), the user solution system 220 may generate a first recommended solution (e.g., generate a new account) from the at least one solution plan and determine whether the first recommended solution (e.g., generate a new account) involves the first sub-goal.

When the first recommended solution (e.g., generate a new account) does not involve the first sub-goal, the user solution system 220 may provide the first recommended solution to the user with a first explanation explaining why the first sub-goal (e.g., generating a new PIN) was excluded. For example, the user solution system 220, using user response system 201, may provide a text message, chat message, or auditory message to Jane that a new account was created, but that a new PIN was not generated at this time; however, Jane can create a new PIN if she logs into her account online. When the first recommended solution involves the first sub-goal (e.g., generating a new PIN), the user solution system 220 may provide the first recommended solution to the user without the first explanation. For example, the user solution system 220, using user response system 201, may provide a text message, chat message, or auditory message to Jane that a new account has been created, and provide her with account details and actions that Jane needs to take.

According to certain example implementations of the disclosed technology, the term "dialogue" or "communications" as used herein may refer to information and/or communication received from a user and/or provided to a user as part of the interaction(s) between the user and the intelligent user response system 201. In some implementations, such interactions may utilize certain communication channels (such as voice, e-mail, messaging, etc.) to exchange textual, audible and/or video information. Certain example implementations may utilize user history records and/or records of communications with human customer service representatives to provide additional context for the interaction between the user and the intelligent agent system. According to certain example implementations of the disclosed technology, the dialogue may be in the form of interactive (i.e., back-and-forth, two-way, conversation-like) communications between the user and the intelligent system 100. In some implementations, the dialogue may be in the form of non-interactive (i.e., single-sided, one-way, story-like) communications. In certain example implementations, records of interactive and/or non-interactive communications conducted with the user may be utilized. In certain implementations, such communication information may be obtained, for example, through a chat window, e-mail, phone call, etc., and/or recorded through textual, audible and/or video information channels.

In certain example implementations, the system 100 may execute instructions to conduct general dialogue with a user to identify a first trigger of a predetermined plurality of triggers. Upon identifying the first trigger, the system 100 may generate one or more responses. Optionally, in some embodiments, the system may generate general information-eliciting utterances. Regardless of whether additional information is required, the system 100 may generate one or more candidate responses. Upon doing so, the system may identify relevant missing information and generate specific information-eliciting responses.

In accordance with certain example implementations, the systems and methods disclosed herein include virtual assistants that utilize machine learning and/or other types of Artificial Intelligence (A.I.) systems to operate and interact with a user without the need for a human user service representative. It is frequently impossible for humans to perform the calculations performed by A.I. systems. For example, and as disclosed herein, the processing that the A.I. systems performs is often not pre-programmed and may vary depending on dynamic factors, such as the utterance input received, a time at which the input data set was processed, other input data previously processed, etc. For A.I. systems (such as those disclosed herein) that employ repeated or continuous learning, it may even be impossible to identify the particular algorithm(s) used to process a given input data set. These complexities indicate that A.I. systems are more than just a set of algorithms, but rather frameworks that are carefully designed in terms of input variables, hyperparameters, optimization variables, training data sets, validation data sets, etc. Certain algorithms may support and define a high-level A.I. framework but may or may not be the same algorithms that are used to process input data. In accordance with certain implementations of the disclosed technology, the machine-learning/A.I. framework disclosed herein performs a superior job (compared with a human) of identifying specific data-processing algorithms (e.g., in terms of machine-learning parameters). Thus, the A.I. system discussed herein may not utilize predefined computer algorithms and may extend well beyond mental processes and abstract ideas.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A system, comprising:
   one or more processors;
   a natural language processing (NLP) device; and
   a memory in communication with the one or more processors and storing instructions that, when executed by the one or more processors, are configured to cause the system to:
      continuously receive one or more communications from a user;
      iteratively update one or more programming commands to generate one or more updated programming commands;
      dynamically and autonomously, via the NLP device:
         interpret the one or more communications;
         responsive to interpreting the one or more communications, generate one or more solutions; and
         based on the one or more updated programming commands, revise the one or more solutions to generate one or more updated solutions;
      retrieve a list of goals from a domain database;
      identify, using a rule-based approach, a first goal and a first sub-goal in the one or more communications based on the list of goals;
      transform, using the rule-based approach, the one or more communications based on the list of goals to generate one or more normalized communications;
      determine whether the list of goals comprises the first goal and the first sub-goal;
      when the list of goals comprises the first goal and the first sub-goal, determine, using a machine learning model, whether the first sub-goal corresponds to the first goal based on the list of goals; and
      when the list of goals comprises the first goal and the first sub-goal and the first sub-goal corresponds to the first goal:
         determine whether the domain database comprises at least one solution plan for the first goal that does not involve the first sub-goal or whether the at least one solution plan can be generated; and
         when the domain database comprises the at least one solution plan for the first goal that does not involve the first sub-goal or the at least one solution plan can be generated:
            determine, using the machine learning model, whether the one or more normalized communications comprise an expression of preference for the first sub-goal; and
            when the one or more normalized communications comprise the expression of preference for the first sub-goal:
               generate a first recommended solution based on the one or more updated solutions by selecting a solution plan from the at least one solution plan in the domain database or by generating the at least one solution plan;
               determine whether the first recommended solution involves the first sub-goal;
               when the first recommended solution does not involve the first sub-goal, provide the first recommended solution to the user with a first explanation explaining why the first sub-goal was excluded; and
               when the first recommended solution involves the first sub-goal, provide the first recommended solution to the user.

2. The system of claim 1, wherein the memory stores further instructions that, when executed by the one or more processors, are further configured to cause the system to:
   when the list of goals does not comprise the first goal or the first sub-goal:
      determine whether the list of goals comprises the first goal or the first sub-goal; and
      when the list of goals comprises the first goal or the first sub-goal, generate a second recommended solution based on the list of goals, generate a second explanation that explains caveats to the second recommended solution, and provide the second recommended solution and the second explanation to the user,
   wherein generating the at least one solution plan involves first principle planning.

3. The system of claim 2, wherein the memory stores further instructions that, when executed by the one or more processors, are further configured to cause the system to:
   when the list of goals does not comprise the first goal and the first sub-goal, generate and provide a clarification communication to the user.

4. The system of claim 3, wherein the memory stores further instructions that, when executed by the one or more processors, are further configured to cause the system to:
when the list of goals comprises the first goal and the first sub-goal and the first sub-goal does not correspond to the first goal:
determine whether the one or more normalized communications comprise a preference for the first sub-goal; and
when the one or more normalized communications comprise the preference for the first sub-goal:
select a second sub-goal from the list of goals with a highest similarity to the first sub-goal;
generate a third recommended solution based on the second sub-goal and the first goal;
generate a third explanation explaining why the first sub-goal cannot be performed;
provide the third recommended solution and the third explanation to the user;
when the one or more normalized communications do not comprise the preference for the first sub-goal:
generate a fourth recommended solution based on the first goal; and
generate a fourth explanation explaining why the first sub-goal cannot be performed.

5. The system of claim 1, wherein the memory stores further instructions that, when executed by the one or more processors, are further configured to cause the system to:
when the domain database does not comprise at least one solution plan for the first goal that does not involve the first sub-goal, determine whether the at least one solution plan is admissible.

6. The system of claim 5, wherein the memory stores further instructions that, when executed by the one or more processors, are further configured to cause the system to:
when the at least one solution plan is admissible, generate a fifth recommended solution based on the first goal and the first sub-goal and provide the fifth recommended solution to the user.

7. The system of claim 6, wherein the memory stores further instructions that, when executed by the one or more processors, are further configured to cause the system to:
when the at least one solution plan is not admissible, generate and provide an admissibility explanation to the user.

8. The system of claim 1, wherein the machine learning model is a recurrent neural network (RNN) comprising long short-term memory (LSTM), a gated recurrent unit (GRU), or a combination thereof.

9. The system of claim 1, wherein the instructions are further configured to cause the system to:
re-train the machine learning model using (i) the one or more communications, (ii) the one or more normalized communications, and (iii) one or more second goals and one or more second sub-goals inconsistent with the one or more second goals.

10. The system of claim 1, wherein the instructions are further configured to cause the system to:
program the NLP device to interpret the one or more communications based on the one or more programming commands.

11. A system, comprising:
one or more processors;
a natural language processing (NLP) device; and
a memory in communication with the one or more processors and storing instructions that, when executed by the one or more processors, are configured to cause the system to:
continuously receive one or more first communications from a user;
iteratively update one or more programming commands to generate one or more updated programming commands;
dynamically and autonomously, via the NLP device:
interpret the one or more first communications;
responsive to interpreting the one or more first communications, generate one or more solutions; and
based on the one or more updated programming commands, revise the one or more solutions to generate one or more updated solutions;
retrieve a list of goals from a domain database;
identify, using a rule-based approach, a first goal and a first sub-goal in the one or more first communications based on the list of goals;
transform, using the rule-based approach, the one or more first communications based on the list of goals to generate one or more normalized communications;
determine whether the list of goals comprises the first goal and the first sub-goal;
when the list of goals comprises the first goal and the first sub-goal, determine, using a machine learning model, whether the first sub-goal corresponds to the first goal based on the list of goals; and
when the first goal is in the list of goals, the first sub-goal is in the list of goals, and the first sub-goal corresponds to the first goal:
determine whether the domain database comprises at least one possible solution for the first goal that does not comprise the first sub-goal or whether the at least one possible solution can be generated; and
when the domain database does not comprise at least one possible solution for the first goal that does not comprise the first sub-goal:
determine whether the at least one possible solution is admissible; and
when the at least one possible solution is admissible, generate a first recommended solution based on the one or more updated solutions and on the at least one possible solution and provide the first recommended solution to the user.

12. The system of claim 11, wherein the memory stores further instructions that, when executed by the one or more processors, are further configured to cause the system to:
when the at least one possible solution is not admissible, provide an admissibility explanation to the user,
wherein generating the at least one possible solution involves first principle planning.

13. The system of claim 12, wherein the memory stores further instructions that, when executed by the one or more processors, are further configured to cause the system to:
when the domain database comprises at least one possible solution for the first goal that does not comprise the first sub-goal:
determine, using the machine learning model, whether the one or more normalized communications comprise an expression of preference for the first sub-goal; and when the one or more normalized communications comprise the expression of preference for the first sub-goal:
  generate a first recommended solution by selecting a possible solution from the at least one possible solution;
  determine whether the first recommended solution comprises the first sub-goal; and
  when the first recommended solution does not comprise the first sub-goal, provide the first recommended solution to the user with a first explanation explaining why the first sub-goal was excluded.

14. The system of claim 13, wherein the memory stores further instructions that, when executed by the one or more processors, are further configured to cause the system to:
  when the first recommended solution comprises the first sub-goal, provide the first recommended solution to the user.

15. The system of claim 13, wherein the memory stores further instructions that, when executed by the one or more processors, are further configured to cause the system to:
  receive second communications from the user comprising instructions to proceed with the first recommended solution; and
  implement the first recommended solution.

16. The system of claim 12, wherein the memory stores further instructions that, when executed by the one or more processors, are further configured to cause the system to:
  when the list of goals does not comprise the first goal or the first sub-goal:
    determine whether the list of goals comprises the first goal or the first sub-goal; and
    when the list of goals comprises the first goal or the first sub-goal, generate a second recommended solution based on the list of goals, generate a second explanation that explains caveats to the second recommended solution, and provide the second recommended solution and the second explanation to the user.

17. The system of claim 16, wherein the memory stores further instructions that, when executed by the one or more processors, are further configured to cause the system to:
  when the list of goals does not comprise the first goal and the first sub-goal, generate and provide a clarification communication to the user that requests clarification on the first goal and the first sub-goal.

18. A system, comprising:
  one or more processors;
  a natural language processing (NLP) device; and
  a memory in communication with the one or more processors and storing instructions that, when executed by the one or more processors, are configured to cause the system to:
    receive one or more communications from a user;
    iteratively update one or more programming commands to generate one or more updated programming commands;
    dynamically and autonomously, via the NLP device:
      interpret the one or more communications;
      responsive to interpreting the one or more communications, generate one or more solutions; and
      based on the one or more updated programming commands, revise the one or more solutions to generate one or more updated solutions;
    retrieve a list of goals from a domain database;
    identify, using a rule-based approach, a first goal and a first sub-goal in the one or more communications based on the list of goals;
    transform, using the rule-based approach, the one or more communications based on the list of goals to generate one or more normalized communications;
    determine whether the list of goals comprises the first goal and the first sub-goal;
    when the list of goals comprises the first goal and the first sub-goal, determine, using a machine learning model, whether the first sub-goal corresponds to the first goal based on the list of goals; and
    when the list of goals comprises the first goal, the list of goals comprises the first sub-goal, and the first sub-goal corresponds to the first goal:
      determine whether the domain database comprises at least one solution plan for the first goal that does not comprise the first sub-goal or whether the at least one solution plan can be generated; and
      when the domain database comprises the at least one solution plan for the first goal that does not comprise the first sub-goal or the at least one solution plan can be generated:
        determine, using the machine learning model, whether the one or more normalized communications comprise an expression of preference for the first sub-goal;
        when the one or more normalized communications do not comprise the expression of preference for the first sub-goal:
          generate a recommended solution based on the one or more solutions and by selecting a solution plan from the at least one solution plans or generating a solution plan using an approach such as first-principles planning; and
          provide the recommended solution to the user with an explanation of the recommended solution.

19. The system of claim 18, wherein the memory stores further instructions that, when executed by the one or more processors, are further configured to cause the system to:
  when the domain database does not comprise at least one solution plan for the first goal that does not involve the first sub-goal, determine whether the at least one solution plan is admissible.

20. The system of claim 19, wherein the memory stores further instructions that, when executed by the one or more processors, are further configured to cause the system to:
  when the at least one solution plan is admissible, generate a fifth recommended solution based on the first goal and the first sub-goal and provide the fifth recommended solution to the user; and
  when the at least one solution plan is not admissible, provide an admissibility explanation to the user.

* * * * *